(12) United States Patent
Kerfoot

(10) Patent No.: US 8,225,856 B2
(45) Date of Patent: Jul. 24, 2012

(54) TREATMENT FOR RECYCLING FRACTURE WATER—GAS AND OIL RECOVERY IN SHALE DEPOSITS

(76) Inventor: William B. Kerfoot, Falmouth, MA (US)

( * ) Notice: Subject to any disclaimer, the term of this patent is extended or adjusted under 35 U.S.C. 154(b) by 0 days.

(21) Appl. No.: 13/229,936

(22) Filed: Sep. 12, 2011

(65) Prior Publication Data

US 2012/0085530 A1 Apr. 12, 2012

Related U.S. Application Data

(63) Continuation of application No. 12/042,590, filed on Mar. 5, 2008, now Pat. No. 8,016,041.

(60) Provisional application No. 60/908,453, filed on Mar. 28, 2007.

(51) Int. Cl.
 *E21B 21/06* (2006.01)
(52) U.S. Cl. ............... 166/75.12; 166/90.1; 166/177.5

(58) Field of Classification Search .................. None
 See application file for complete search history.

(56) References Cited

U.S. PATENT DOCUMENTS 5,426,137 A *  6/1995  Allen ........................ 523/318
6,318,464 B1 * 11/2001  Mokrys ..................... 166/252.1

* cited by examiner

*Primary Examiner* — Zakiya W Bates
(74) *Attorney, Agent, or Firm* — Fish & Richardson P.C.

(57) ABSTRACT

A method and apparatus for hydrocarbon recovery and/or treatment of frac water includes introducing a volume of water into a formation, recovering the introduced water, with the recovered introduced water further comprising suspended hydrocarbon product. The recovered liquid is treated to remove substantial amounts of the suspended hydrocarbon product, provide the treated recovered liquid with a ORP in a range of 150 mv to 1000 mv, and partially desalinated, and is either re-introduced as treated recovered liquid with the ORP into a formation to assist in recovery of additional hydrocarbon deposits in the formation, or is stored to reduce the ORP and then subsequently discharged into surface waters.

19 Claims, 21 Drawing Sheets

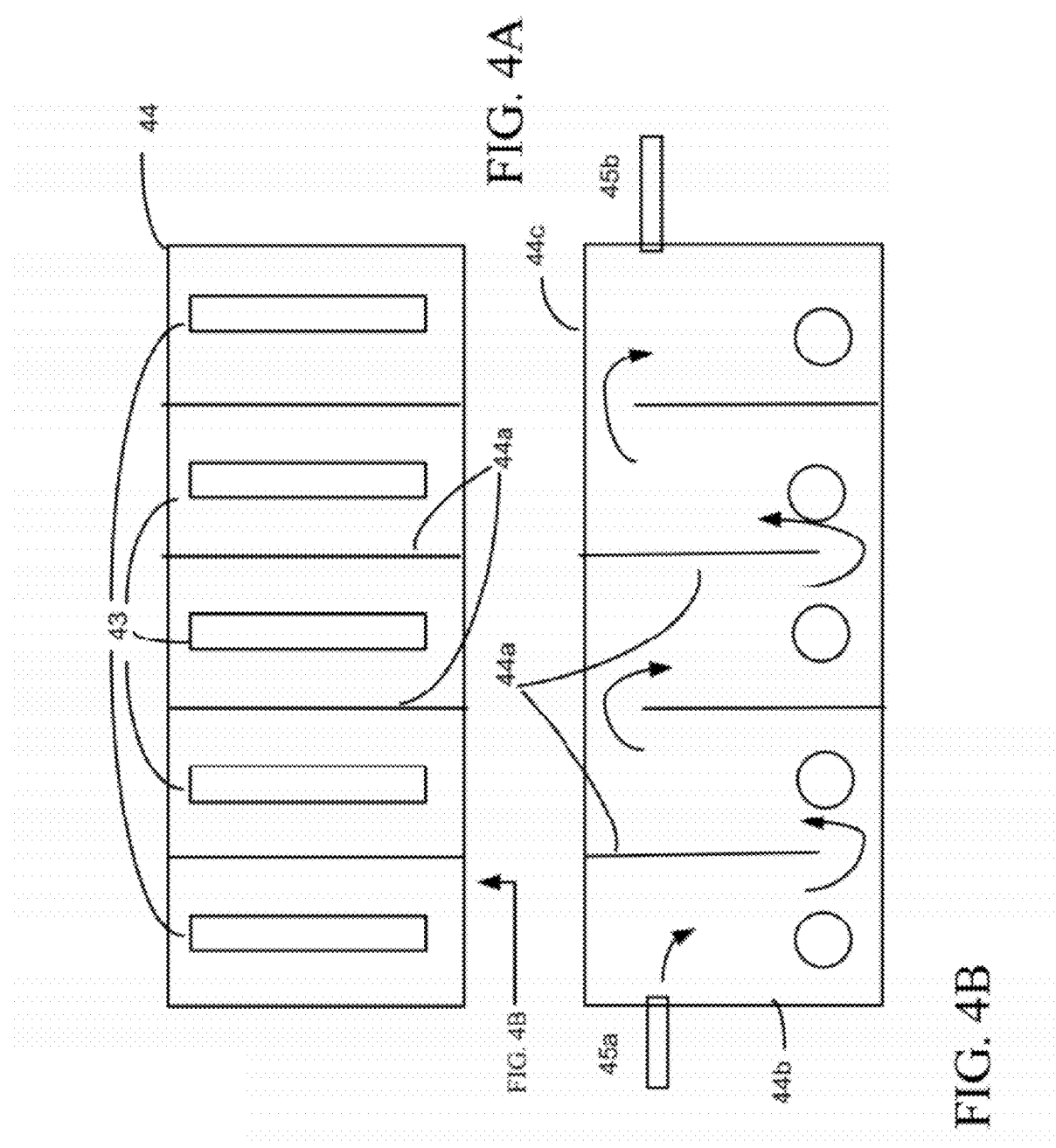

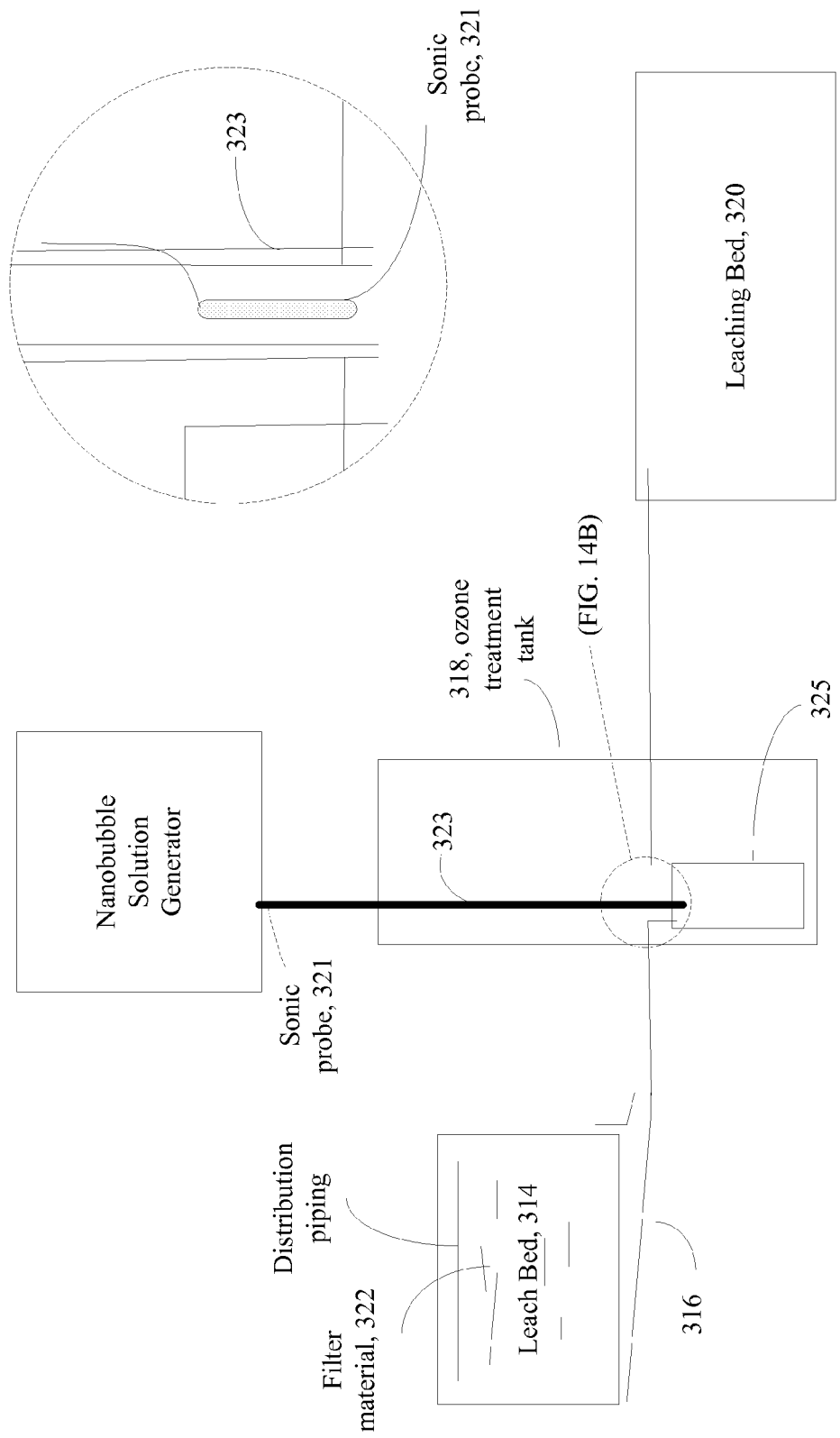

TREATMENT FOR RECYCLING FRACTURE WATER—GAS AND OIL RECOVERY IN SHALE DEPOSITS

This application is a continuation (and claims the benefit of priority under 35 USC 120) of (U.S. application Ser. No. 12/042,590, filed Mar. 5, 2008 (now U.S. Pat. No. 8,016,041), which claims priority from U.S. provisional application Ser. No. 60/908,453, filed Mar. 28, 2007. The disclosure of the prior applications is considered part of (and is incorporated by reference in the disclosure of this application.

BACKGROUND

This invention relates to shale based gas and oil recovery methods and fracture water treatment.

The gas industry has developed techniques to recover natural gas from shale deposits by so called "horizontal fracturing." In horizontal fracturing, a stream of water is injected under pressure into wells disposed through shale deposits. The fracturing process uses, e.g., from 1 to 3 million gallons of water per fracture effort. Once the fracturing is completed, the water (i.e., "frac water") is contaminated with petroleum residue and is returned to holding tanks for decontamination. In the holding tanks, the return water settles layers comprising a clear petroleum product, e.g., light non-aqueous phase liquids (LNAPL), which are liquids that are nearly insoluble in water and less dense than water and an underlying water product. For example, oil, gasoline, etc. are examples of LNAPLs. This LNAPL, clear petroleum product, is normally decanted off into tanks or a lined reservoir and sold to refineries as a petroleum product.

The underlying water layer is contaminated, e.g., by high concentrations of alkanes, and may be somewhat saline. Generally, the underlying water contains from 1 to 4 parts per thousand chlorides (10,000-40,000 ppm) after usage. Other ranges are of course possible based on environmental conditions. Normally, drinking water standards generally require levels less than 250 ppm chloride, in order to have proper viscosity for discharge, whereas river discharge standards require generally levels less than 2,000 ppm, although this standard can vary.

SUMMARY

According to an aspect of the invention, a method of hydrocarbon recovery includes introducing a volume of water into a formation with the water having an oxidation/reduction potential (ORP) of at least about 100 mv. in a range of 150 mv to 1000 mv.

The following are embodiments within the scope of the invention.

The formation includes shale deposits. The method includes treating a volume of water having suspended hydrocarbon product by exposing the volume of water to ozone and/or a hydro-peroxide to produce the volume of water having the ORP, with the ORP being in the a range of about 150 mv to 1000 mv. The volume of water that is treated is frac-water that is recovered from fracture operations in a formation having hydrocarbons.

The method includes exposing the recovered liquid to a fluid comprising ozone gas trapped in micro or nano size bubbles to provide the volume of water having the ORP the a range of about 150 mv to 1000 mv. The method includes exposing the recovered liquid to a fluid comprising ozone gas trapped in micro or nano size bubbles and hydrogen peroxide to provide the volume of water having the ORP in the a range of about 150 mv to 1000 mv. The method includes exposing the recovered liquid to a fluid comprising ozone gas trapped in micro or nano size bubbles of hydrogen peroxide coated bubbles to provide the volume of water having the ORP in the a range of about 150 mv to 1000 mv.

According to a further aspect of the invention, a method includes receiving water that was introduced into a earth formation, with the received, introduced water comprising suspended hydrocarbon product in the water, treating the recovered water to remove substantial amounts of the suspended hydrocarbon product by exposing the recovered water to ozone/air bubbles having a size less than 500 microns and to provide the treated recovered water with a ORP in a range of 150 mv to 1000 mv and re-introducing the treated recovered water with the ORP into a formation.

The following are embodiments within the scope of the invention.

The formation includes shale deposits. The suspended hydrocarbon product comprises alkanes and alkenes. Re-introducing includes re-introducing the treated recovered water with the an ORP in a range of 150 mv to 1000 mv into a the formation to assist in recovery of additional hydrocarbon deposits in the formation, recovering the re-introduced, treated recovered water, and treating the recovered re-introduced, treated recovered water to remove additional hydrocarbon product. The method includes exposing the recovered water to a fluid comprising ozone gas in bubbles having a size less than 200 microns. The method includes exposing the recovered water to a fluid comprising ozone gas in bubbles having a size less than 200 microns and hydrogen peroxide. The method includes exposing the recovered water to a fluid stream of microbubbles entrapping ozone gas in bubbles having a size less than 1 micron. The method includes exposing the recovered water to a fluid stream of hydrogen peroxide coated microbubbles entrapping ozone gas in bubbles having a size less than 1 micron.

Re-introducing the treated recovered liquid with the ORP into a formation reintroduces the treated recovered water into the same formation that the recovered water was recovered from. Re-introducing the treated recovered water with the ORP into a formation reintroduces the treated recovered water into a different formation than the recovered water was recovered from. The reintroduced, treated recovered water has an ORP in a range of 150 mv to 1000 mv.

According to a further aspect of the invention, an arrangement for hydrocarbon recovery includes a treatment tank that receives fracture water, recovered in fracture recovery of hydrocarbon product from a formation, and treats the water to provide the water with an ORP in a range of about 150 mv to 1000 mv, the treatment tank including an inlet that receives the recovered fracture water, at least one chamber, a diffuser disposed in the chamber to introduce gaseous ozone and hydrogen peroxide into the fracture water, and an outlet configured to be coupled to a well that re-introduces the recovered water from the treatment tank into a formation.

The following are embodiments within the scope of the invention.

The treatment tank is a baffled treatment tank, including a plurality of baffled chambers, with at least some of the chambers having a diffuser disposed therein to deliver ozone and hydrogen peroxide to recovered fracture water in the tank. The treatment tank is a baffled treatment tank, comprising a plurality of baffled chambers, with at least some of the chambers having a nano-bubble generator disposed in the chamber to deliver nano-bubbles of ozone/air coated with hydrogen peroxide. The arrangement includes a storage tank that receives the recovered water from the treatment tank and stores it prior to the recovered water being re-introduced into the formation.

The arrangement includes a storage tank coupled to the treatment tank, the storage tank receiving the recovered water extracted from the formation and stores the recovered water prior to the recovered water being introduced into the treatment tank. The arrangement includes a storage tank, a treatment lagoon fluidly coupled to the storage tank, the treatment lagoon receiving the recovered water from the storage tank to treat the recovered water prior to the recovered water being introduced into the treatment tank.

According to a further aspect of the invention, a method of hydrocarbon recovery includes introducing a volume of water into a formation, recovering the introduced water, with the recovered, introduced water further comprising hydrocarbon product, treating the recovered water to remove portions of hydrocarbon product suspended in the water, by exposing the recovered water to a fluid stream of hydrogen peroxide coated bubbles entrapping ozone gas, re-introducing the treated recovered water back into a formation and recovering additional water from the formation with the additional water comprising additional hydrocarbon product that was liberated from the formation.

The following are embodiments within the scope of the invention.

The suspended hydrocarbon product comprises alkanes and alkenes. The bubbles have a diameter in a range of about 0.05 microns to about 200 microns. The method includes pre-treating the recovered introduced liquid to remove substantial portions of hydrocarbon product leaving substantially suspended hydrocarbon product in the liquid.

According to a further aspect of the invention, a method of treating fracture water includes recovering introduced liquid from a formation, the recovered introduced liquid comprising suspended hydrocarbon product, treating the recovered liquid to remove substantial amounts of the suspended hydrocarbon product, in part by, exposing the recovered water to bubbles trapping air/ozone with the bubbles having a bubble size in a range of 0.05 to 200 microns.

The following are embodiments within the scope of the invention.

Treating includes allowing the recovered liquid to be held to permit lighter product to be skimmed off of the product, prior to exposing the water to the bubbles. The suspended hydrocarbon product comprises alkanes and alkenes. Treating includes holding the recovered liquid to permit heaver constituents to settle from the recovered liquid. Treating includes allowing the recovered liquid to be held to permit lighter product to be skimmed off of the product, and holding the recovered liquid to permit heaver constituents to settle from the recovered liquid prior to exposing the recovered liquid to a fluid comprising ozone gas and hydrogen peroxide. Treating includes exposing the recovered liquid to a fluid stream of hydrogen peroxide coated microbubbles entrapping ozone gas. The recovered liquid after treatment by the ozone is essentially water that can be discharged into surface waters. Delivering the treated, recovered liquid after treatment by the ozone to a holding area to reduce the ORP until the water can be discharged.

An treatment tank includes a vessel to receive contaminated water and to treat the water, the vessel having walls to form an enclosure and including an inlet to receive contaminated water. The tank also includes a plurality of chambers that are partitioned in the vessel by baffle walls that extend between two opposing sides of the vessel with a first group of the baffle walls having a portion that extends above the surface level water and a second group of the baffle walls having bottom portions that are displaced from a bottom surface of the vessel, diffusers disposed in the chambers to introduce a gaseous and liquid into the chambers, and an outlet.

The following are embodiments within the scope of the invention.

The diffusers are disposed to deliver ozone and hydrogen peroxide to contaminated water in the vessel. At least some of the chambers having a nanobubble generator disposed in the chamber to deliver nanobubbles of ozone/air coated with hydrogen peroxide. The arrangement includes a nanobubble generator disposed as the inlet to the vessel. Some of the baffles have a spill-way portion on the top of the baffles that extend above the water line level. Some of the baffles have a spill-way portion on the bottom of the baffles that are displaced from the bottom of the vessel.

One or more aspects of the invention may provide one or more of the following advantages.

The techniques separate out product, treat resulting underlying water (aqueous) fraction, remove a fraction of saline (chlorides), and return water for reuse at quality of surface water discharge conditions. Additionally the techniques use treated frac water having a level of reactivity and re-introducing the frac water into a new or existing well hole to dissolve paraffins and other constituents to assist with secondary and tertiary release and recovery of hydrocarbon product from these and other petroleum deposits. The treated frac water having a level of reactivity (e.g., elevated oxidation-reduction potential (ORP)) can be used with or without conventional surfactants for enhanced hydrocarbon recovery from shale and like deposits. The elevated ORP aids in dissolving of paraffins, whereas introduction of nanobubbles under elevated pressures result in collapse of bubbles with a concomitant release of energy that aids in fracturing and paraffin reduction.

Ozone has shown a high affinity to attack alkane fractions. In laboratory testing and field trials, as the ozone concentration has been increased and the size of microbubbles decreased to below micron levels, the efficiency of reactivity has increased to the level beginning to exceed the normal ratio of 1 to 3 molar, or 1/3 of the ozone molecules being involved, common to normal ozone molecular reactions where only the terminal oxygen inserts. It has been thought that secondary biological (bacterial) reactions may be responsible for the ratio approaching 1 to 1 on a mass to mass basis. However, I now believe that there is sufficient basis from laboratory tests to define a newer reactive form of ozone which has become apparent as the bubble size moves from micron size to nano size diameters.

This may prove particularly capable of removing petroleum chain products and to treat sewage effluent since the long-chain fatty products are known as the common clogger of leaching fields.

According to an additional aspect of the invention, the invention provides a new form of reactive ozone and techniques for producing nanobubble suspensions.

According to a further aspect of the invention, a method includes a method includes forming bubbles having a submicron radius, the bubbles entrapping a high concentration of ozone, with the ozone orienting a net negative charge outwards and a net positive charge inwards.

According to a further aspect of the invention, a method, includes delivering ozone gas to a diffuser that emits bubbles having a diameter substantially less that 1 micron and selecting conditions under which the ozone gas emanates from the diffuser, entrapped as a gas in the bubbles and having an orientation of negative charge on the surface of the bubbles.

According to a further aspect of the invention, a method includes a diffuser including a casing, a bubble generator disposed in the casing and a stirrer disposed at an egress of the casing.

According to a further aspect of the invention, a panel includes an ozone generator, a controller, a metering gas generator/compressor, and a nano bubble solution generator.

According to a further aspect of the invention, a discharge tube is fed by a nano bubble solution generator in which is disposed an acoustic probe at the end for dissemination of the reactive liquid.

One or more advantages can be provided from the above.

The treatment techniques can use bubbles, bubbles with coatings, and directed sound waves to treat volatile organic compounds (VOCs), pharmaceuticals, and other recalcitrant compounds found in drinking water, ground water, sewage, and chemical waste waters. Nano scale reactions should allow a three to tenfold increase in efficiency of reactions which will significantly improve treatment, e.g., reduction of residence contact time, reduction of column height for treatment, etc.

The new, reactive form of ozone is manifest as a nanoscale film. The arrangements combine new reactive ozone species with dissolved ozone, suspended with nanoscale gaseous ozone. Sonic vibration can be used to restructure the ozone bubbles to allow for sonic vibration of the nanoscale spherical film surfaces to further increase selectivity and reactivity. The addition of coatings of peroxides further enhances reactive radical production of hydroxyl and perhydroxyl species further improving reaction rates.

With an ex-situ system, the generation of suspended homogenized micro to nanoscale-sized ozone bubble solutions allowing the flow of the reactive liquid into a treatment container (ozone tank or sump) without concern for fouling of a membrane or microporous surface during gas generation. The generator can be supplied with filtered tap water (normally available with 50 psi pressure), an ozone generator, and small pump with house current (120V) and housed in a simple container for application.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 4A-B and 5A-B are diagrams of a baffled treatment tank.

FIG. 14A is a schematic, elevational view of the septic system of FIG. 14.

FIG. 14B is a blown up view of a portion of FIG. 14A.

DETAILED DESCRIPTION

Figure 1:
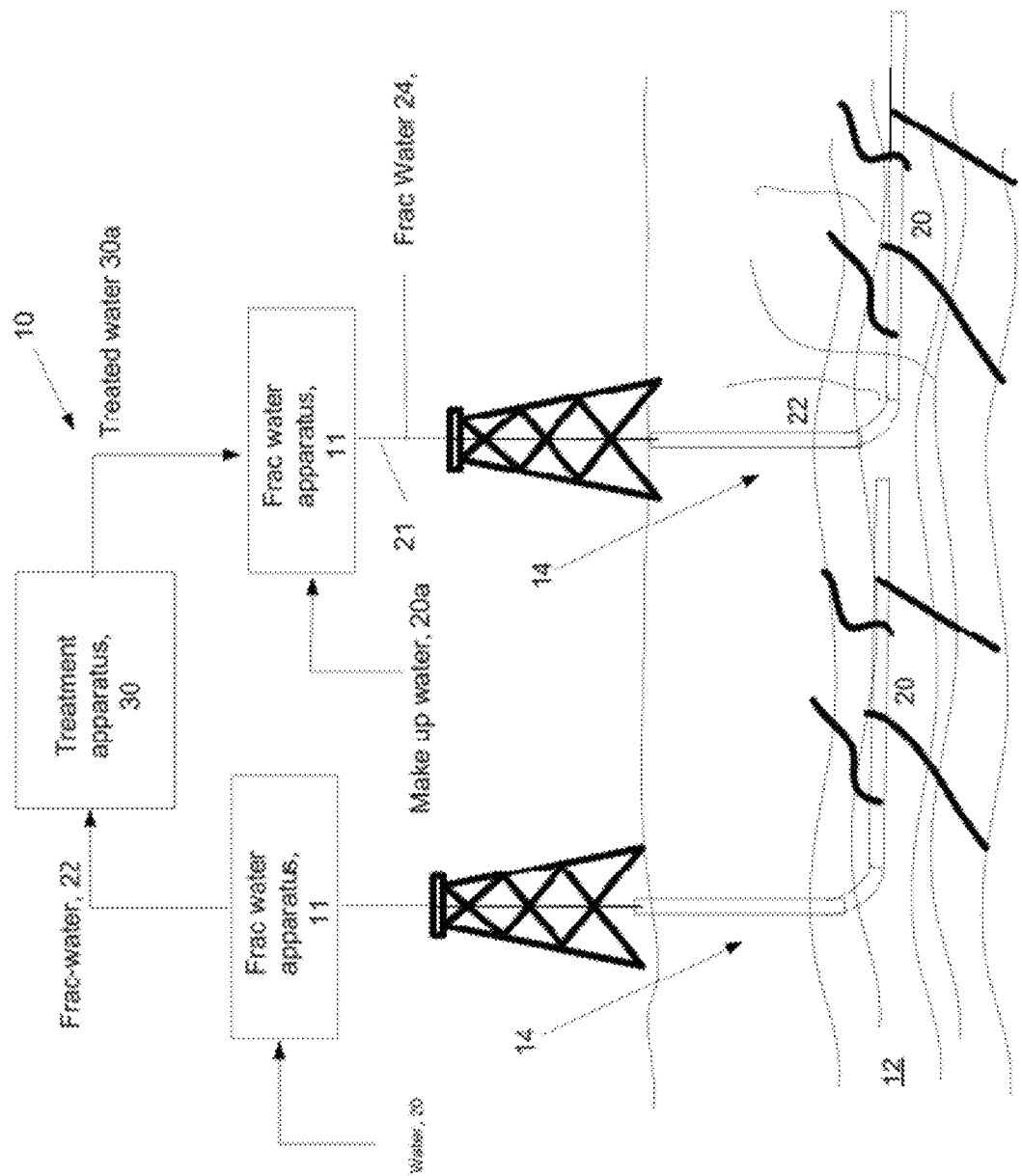
FIG. 1 is a block diagram of an arrangement for horizontal fracturing with treated water.

Referring to FIG. 1 an arrangement 10 for recovery of hydrocarbons in earth deposits, such as shale 12 is shown. The arrangement can be used in other deposits that have hydrocarbons, such as tar sands and so forth. Tar sands are often used to refer to bituminous sands, oil sands or extra heavy oil deposits. Tar sands include sand or/and clay, water, and extra heavy crude oil. The arrangement 10 includes the injection of water under pressure. Wells 14 are drilled into, e.g., shale and are diverted horizontally and then holed by special down-well tools to allow the fluid to fracture the shale horizontally. The fluid, e.g., water is injected with beads (propagent) to hold the channels open after fracturing. A single well normally yields return fluids water and product of up to 60% of injected water or more. The arrangement 10 includes conventional horizontal well fracture apparatus 11, and a treatment apparatus 30 that will be described in FIG. 2. Other fracturing techniques could be used.

The arrangement 10 includes a plurality of horizontal wells 14, as shown. A first one of the horizontal wells 14 is used to deliver a fluid, e.g., water 20 under pressure to shale 12 that lies below the surface. For this first one, the water is typically water that comes from, e.g., a river and so forth. The water 20 under pressure is used to fracture the underlying shale formations causing fracture pathways in the shale to allow for extraction of hydrocarbon product that is trapped in the shale. The same borehole is used to recover e.g., 60% of the injected water which rebounds under pressure, (e.g., the water is injected under pressure sufficient to lift the soil weight above it (fracturing)). When the source pressure is removed, the formation weight collapses on the fracture, pushing the water back up the pipe under considerable pressure. The original fracture well 14 is used to recover the water 22 that was introduced under pressure. This water 22 is commonly referred to as fracture water or "frac-water." The frac water 22 is contaminated with, e.g., homogenized, hydrocarbon product, as well as other products. The water 20 is supplied from a supply (not shown) and is pumped under very high pressures into the formation via a compressor. Often many thousands if not millions of gallons of water are introduced to fracture the underlying shale.

The arrangement 10 includes at least a second other horizontal well 14, as shown. The second horizontal well 14 is used to deliver a fluid, e.g., water 21, comprised of "make up"

water 20a (make-up referring to the volume of water that was not recovered from the first well 14 and that needs to be added to the second well) under pressure that is combined with so called "treated water 30a" that comes from treatment apparatus 30, to the shale 12 that lies below the surface. The water 21 under pressure is used to fracture the underlying shale formations causing fracture pathways in the shale to allow for extraction of hydrocarbon product that is trapped in the shale, as before. However, the water 21 because it includes the treated water 30a has an elevated ORP that can be used to advantage to dissolve paraffin that can inhibit release of hydrocarbon product. The same borehole in the second well 14 is used to recover again over 60% of the injected fluid, e.g., water, (and hydrocarbon product) which rebounds under pressure. The frac water 24 from the second well 14 is again contaminated with hydrocarbon product, which would in general be a higher percentage of hydrocarbon product than the first well that did not use the treated water 30a with the elevated ORP, as well as other products. It can be treated and discharged or treated and re-injected into a subsequent well.

In addition, the arrangement 30 with a single one of the wells 14 can be used for treatment (without re-injection) but rather discharge, as also discussed below.

Figure 2:
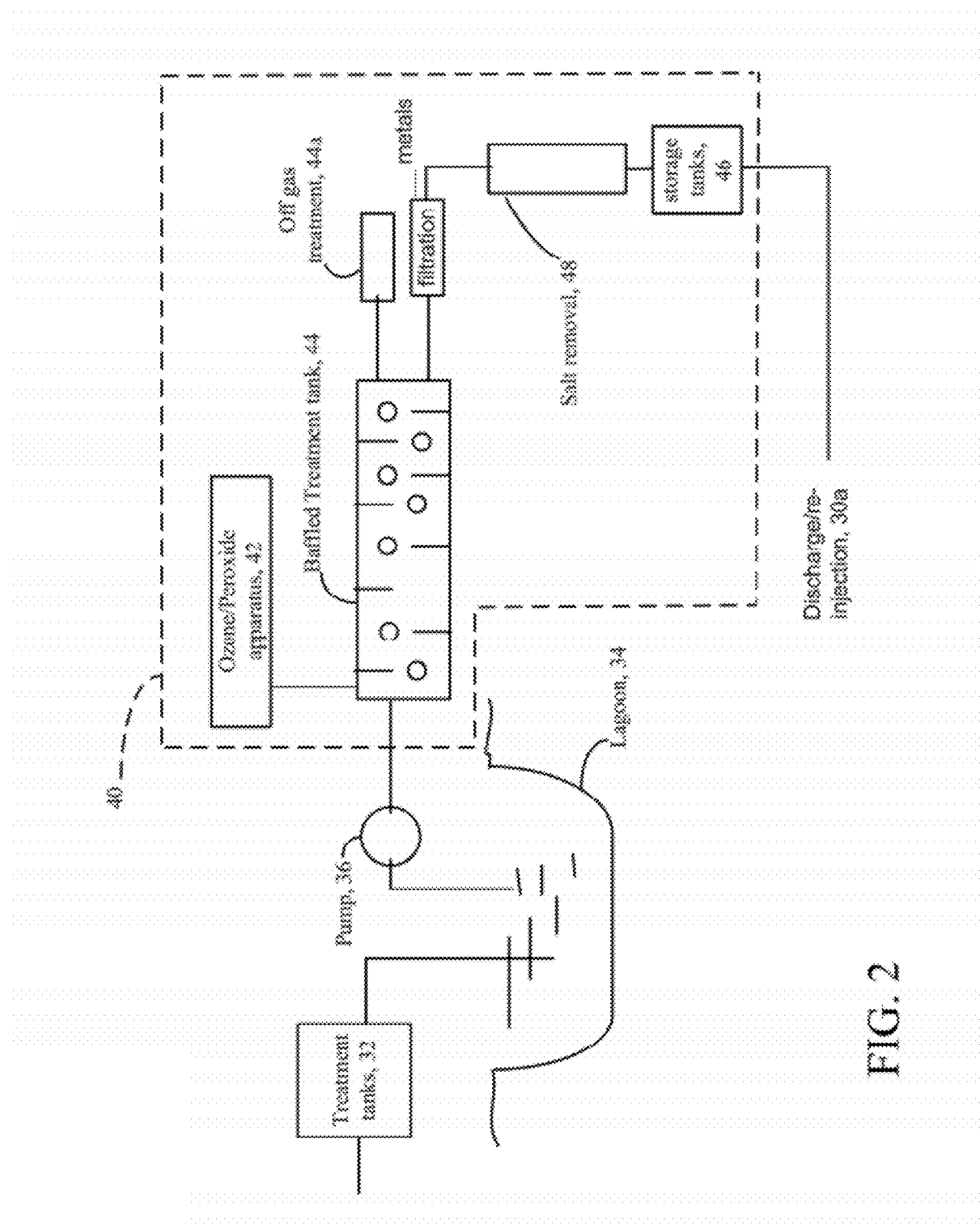
FIG. 2 is a block diagram of a water treatment arrangement.

Referring now to FIG. 2, a treatment system 30 for treatment of "frac-water," e.g., the extracted water 22 or 24 used in fracturing the shale deposits, and which is used to provide the treated water 30a, for subsequent fracturing or for discharge is shown. The system 30 includes product separation treatment tanks 32, a settling lagoon 34 (or storage tanks), and a pump 36. The pump transfers liquid from the settling lagoon 34 or other storage tanks to a chemical oxidation treatment system 40 for removing VOCs (volatile organic compounds) and TOC (total organic carbon), heavy metals, (e.g., Fe, Mn, etc.) and to a desalination unit 48 for salt removal.

As mentioned, the extracted frac-water 22 from the formation comprises "product", e.g., light non-aqueous phase liquids (LNAPL) and an underlying water product. The frac-water 22 is allowed to separate into the LNAPL and underlying water in the product separator and initial storage tanks 32 where substantial LNAPL product, e.g., are skimmed off of the surface of the recovered frac-water. This product is typically sold and used for various purposes. An exemplary analysis of a typical product is:

| Product: Petroleum Hydrocarbons C8 to C30 (Similar to aviation/jet fuel) Contains: | | |
|---|---|---|
| | Toluene | .019 |
| | Xylenes | .045 |
| (est.) | Benzene | .009 |
| (est.) | Ethylbenzene | .007 |
| (est.) | Trimethylbenzene | .018 |
| (est.) | Acetone | .005 |

(est. from aqueous fraction by proportion)
TPH 70% alkanes C6 to C30 15% VOCs (BTEX, etc.)
No PAHs found

| SVOCs | ND (None detected) |
|---|---|
| Alkanes/Alkenes | Petroleum Hydrocarbons GC-GRO |
| | Gasoline-range organics 380,000 µg/L |
| | GC-DRO |
| | Diesel-range organics 182,000 µg/L |

| Metals (in aqueous) | |
|---|---|
| Copper, total | .041 mg/L |
| Iron, total | 11 mg/L |
| Lead, total | ND |
| Manganese, total | 1.84 mg/L |
| Zinc, total | .072 mg/L |

The liquid that remains is generally an emulsion including water and other hydrocarbon products. An exemplary analysis of a typical aqueous fraction, which was part of the frac-water from the product analysis above, is:

| Aqueous Fraction: | |
|---|---|
| VOCs | (µg/L) |
| Benzene | 370 |
| Toluene | 1800 |
| Ethylbenzene | 230 |
| p/m Xylene | 2600 |
| o Xylene | 540 |
| Acetone | 1100 |
| n-Butylbenzene | 140 |
| sec-Butylbenzene | 41 |
| Isopropylbenzene | 63 |
| p-Isopropyltoluene | 84 |
| n-Propylbenzene | 98 |
| 1,3,5 Trimethylbenzene | 920 |
| 1,2,4 Trimethylbenzene | 1000 |

| SVOCs | ND (Nondetect) |
|---|---|
| Alkanes/Alkenes | Petroleum Hydrocarbons GC-GRO |
| | Gasoline-range organics 380,000 µg/L |
| | GC-DRO |
| | Diesel-range organics 182,000 µg/L |

| Metals (in aqueous) | |
|---|---|
| Copper, total | .041 mg/L |
| Iron, total | 11 mg/L |
| Lead, total | ND |
| Manganese, total | 1.84 mg/L |
| Zinc, total | .072 mg/L |

This emulsion is fed to the settling lagoon 34 (or a large tank) where semi-volatile organics and metals particulates settle out.

From the settling lagoon 34 the aqueous fraction still comprises organic hydrocarbons that are in an emulsion or suspension. The liquid from the settling lagoon 34 is fed to a pump 36 that pumps the liquid into the oxidation treatment system 40.

Figure 3:
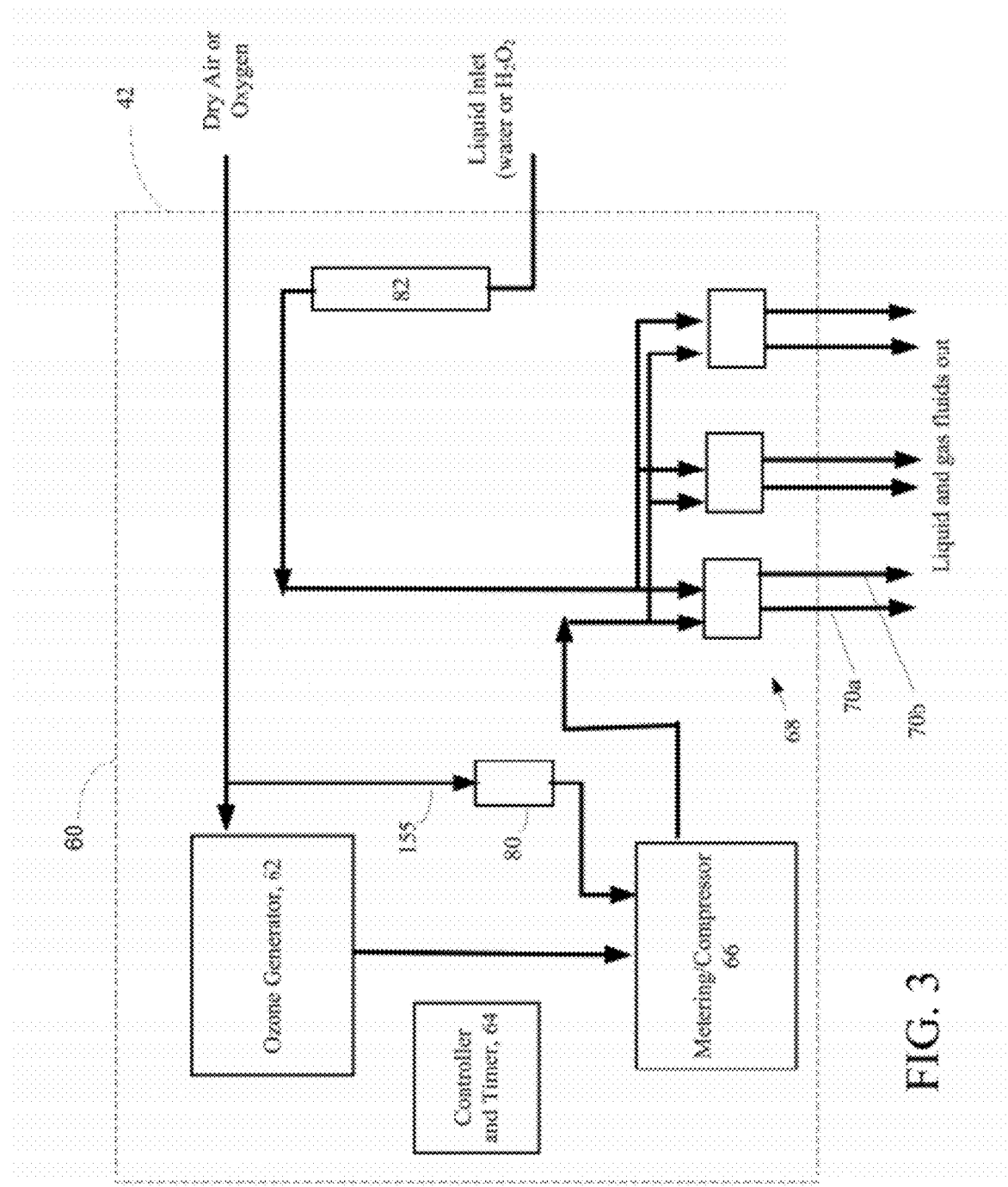
FIG. 3 is a block diagram of details of the treatment arrangement.

The chemical oxidation treatment system 40, an exemplary, detailed embodiment of which is discussed in FIG. 3, includes an ozone/peroxide apparatus 42 that feeds streams of air/ozone/hydrogen peroxide to diffusers 43 disposed in a baffled treatment tank 44. The diffusers 43 can be of any type but preferably are laminar microporous diffusers or LAMINAR SPARGEPOINTS® from Kerfoot Technologies, Inc. Mashpee Mass., as described in U.S. Pat. No. 6,436,285 incorporated herein by reference in its entirety.

The contaminated water is removed from the baffled treatment tank 44, is filtered to remove metal precipitates 45, partially desalinated 46, and is allowed to reside in a storage tank 48 for a period of time, e.g., 1-2 months, for discharge in surface waters or less than 2 weeks (or immediately) for re-induction into a new drill hole to break down paraffins and other materials to increase hydraulic conductivity. These paraffins and other materials tend to clog fractures in the formation. Previous attempts to remove these include addition of surfactants. Surfactants can be used with the treated water. Off-gas from the baffled tank containing residual ozone, carbon dioxide, and air is sent through catalyst (carulite) for treatment 44a.

Referring now to FIG. 3, a detailed example 60 of the ozone/peroxide apparatus 42 (FIG. 2) that is part of the chemical oxidation treatment system 40 (FIG. 2) is shown. The ozone/peroxide apparatus 42 includes an ozone generator, timer/controller 64, compressor/metering 66, solenoids 68, and lines 70 and a distribution manifold that distributes plural flows of a liquid oxidant such as hydrogen peroxide and ozone/air to plural diffusers 43 that reside in baffled treatment tank. Details on various configurations for ozone/peroxide apparatus 42 are described in the above application. Other configurations are disclosed in U.S. Pat. No. 6,582,611(B1) also incorporated herein by reference in its entirety.

Typical specifications for the operation of the system are set out below:

| Organic Treatment Unit Characteristics and Specifications | |
| --- | --- |
| Water flow: | 60,000 gallons/day (2,500 gal/hr) |
| Volume: | 10,560 gallons |
| Residence time: | 4 hours |
| Ozone requirement: | 1 to 1 ($O_3$/carbon) |
| Contaminant level: | |
| | Goals |
| VOCs: 2000 µg BTEX | <20 µg BTEx |
| Alkanes: 500 mg TPH | <10 mg |
| Ozone demand: | 25 lbs/day (cooling $H_2O$ may or not be required depending on local conditions) |
| Compressor: | 50-200 cfm |
| Oxygen Generator: | 3.5 scfm |
| Peroxide tank: | 300 gallon (10%) |
| Peroxide pump: | .01 to .2 gallons/minute |
| Ozone/peroxide ratio: | 1 to 2 (molar) |
| Ozone concentration: | 500 to 5000 ppmv |
| Gas (air/ozone) to water volume ratio: | 5 to 1 |

An example of a baffled treatment tank is disclosed in U.S. Pat. No. 6,436,285 which is incorporated herein by reference in its entirety.

Figures 5A, 5B:
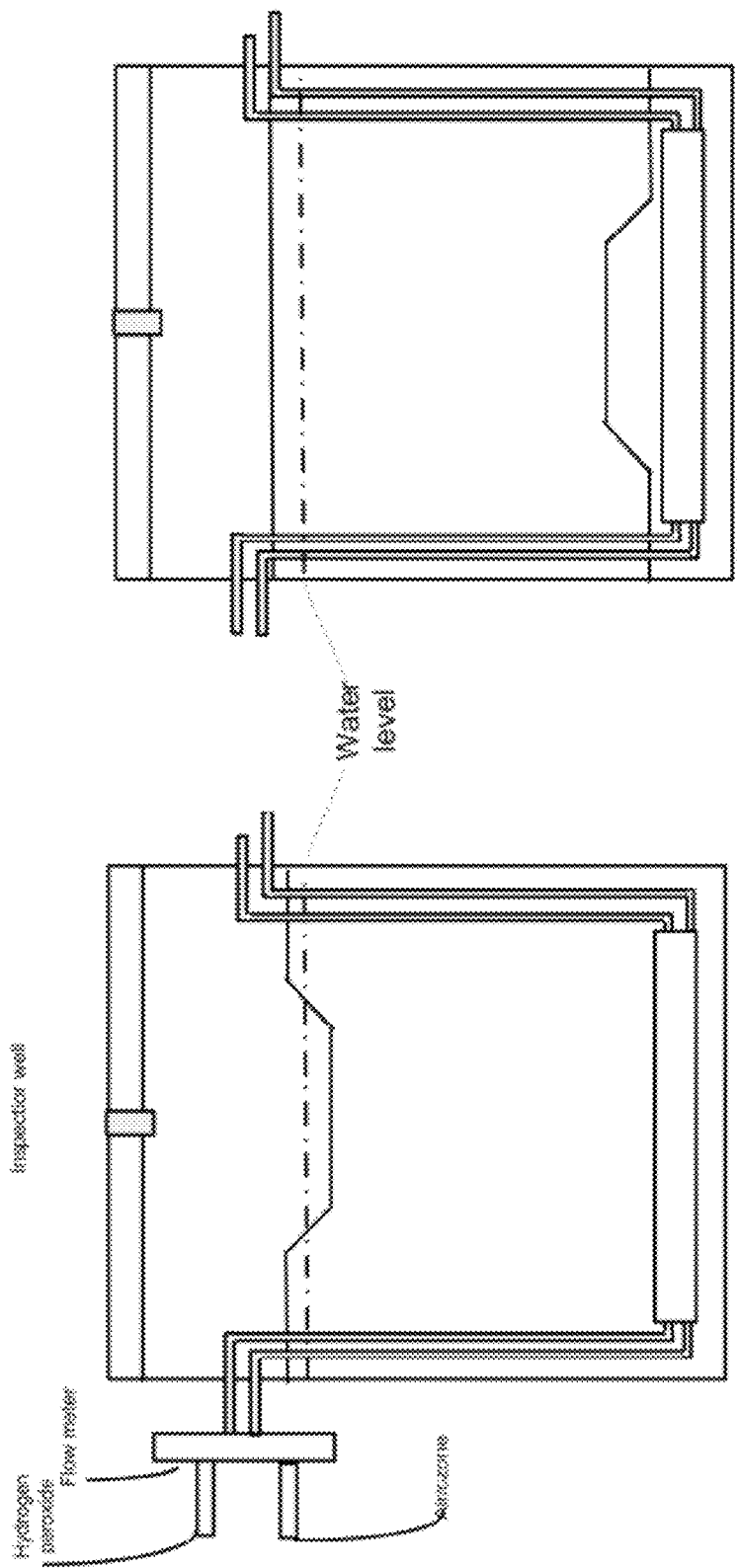

An alternative example is shown in FIGS. 4A-4B, the details of the coupling of the microporous diffusers 43 in the tank 44 being omitted for clarity in these figures, but exemplary connection arrangements are shown in FIGS. 5A and 5B. In this example, the baffled treatment tank 44 has a vessel or body portion 44b generally here rectangular, and has baffles 44a that are displaced in a vertical dimension to permit circulation down one chamber and up an adjacent chamber, as shown in FIGS. 5A and 5B.

The treatment tank thus includes, in addition to the vessel 44b, an inlet 45a to receive contaminated water and a plurality of chambers that are provided as partitions in the vessel by the baffle 44a that extend between two opposing sides of the vessel 44b with a first group of the baffles 44a having a portion that extends above a surface level of the water and a second group of the baffles 44a having bottom portions that is displaced from a bottom surface of the vessel 44b. Diffusers 43 are disposed in the chambers to introduce a gaseous and liquid into the chambers and the vessel includes an outlet. As will be discussed below, in some embodiments, some or all of the chambers have a nanobubble generator disposed in the chamber to deliver nanobubbles of ozone/air coated with hydrogen peroxide. As will be also discussed below, a nanobubble generator can be disposed as the inlet 45a to the vessel.

The baffles have a spill-way portion on the top of the baffles that extend above the water line level or a spill-way portion on the bottom of the baffles that are displaced from the bottom of the vessel.

The baffled tank 44 also includes an outlet 45b and in some embodiments a top cover member 44c so that the water is introduced into the tank 44 under pressure, e.g., typically less than 20 psi. In other embodiments the tank can be open and not operate under pressure.

Other arrangements are possible, as will be discussed below.

From the baffled treatment tank 44, the water at an outlet 45b may be filtered for metal removal, stored and/or sent for desalinization, if the water is saline. Generally, the water contains about 40 parts per thousand chlorides (40,000 ppm) after usage and decontamination by the air/ozone/hydrogen peroxide. If the water is somewhat saline after treatment by the air/ozone/hydrogen peroxide the water can be desalinized via an ultra-filtration reverse osmosis/(RO) salt removal filter 48, (FIG. 2) to remove salt to below contact or drinking water standards e.g., 250 to 1000 ppm chloride, or for river discharge, e.g., less than 2000 ppm, or recharge for fracturing, e.g., less than 20,000 ppm, as necessary.

Figure 6:
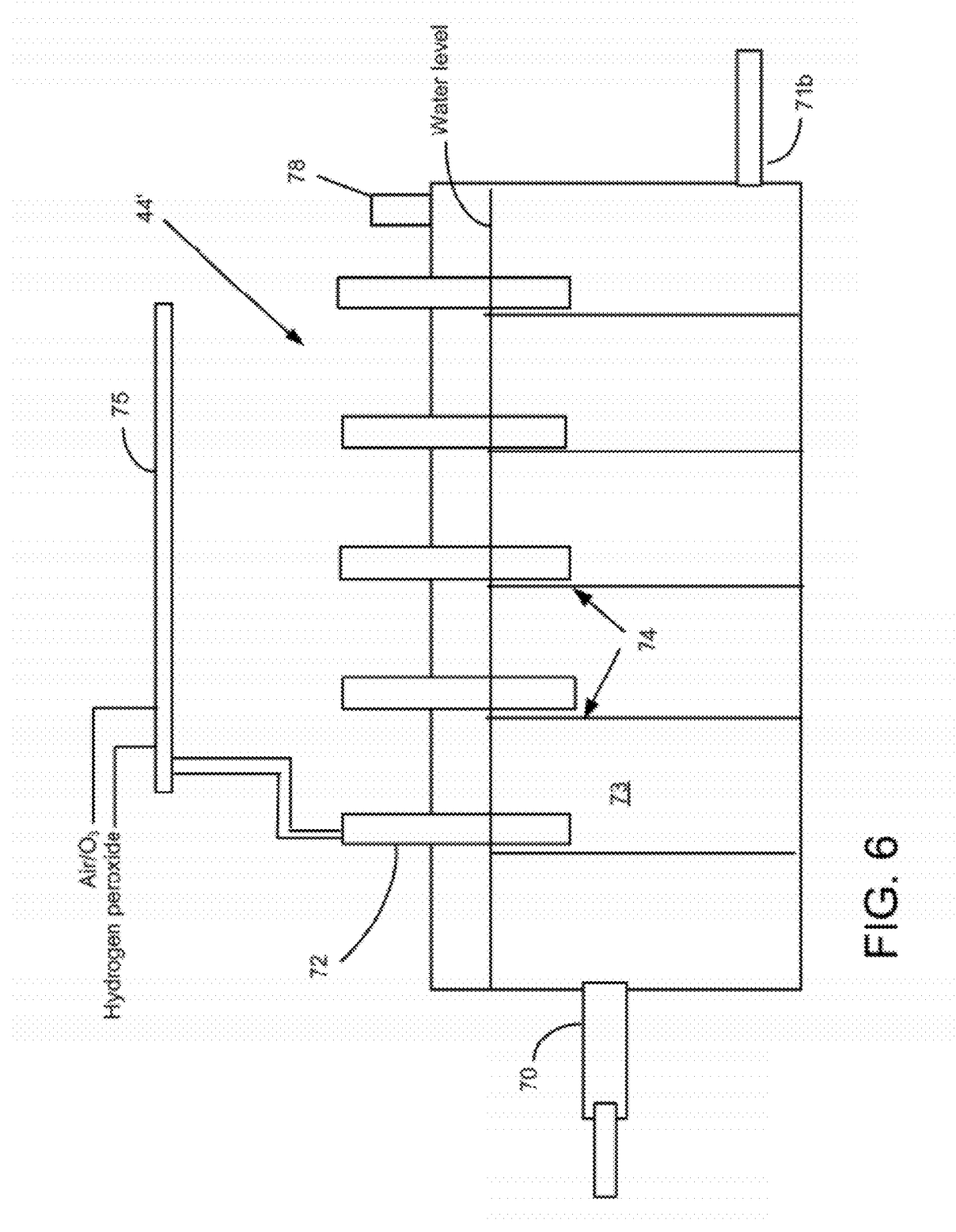
FIG. 6 is a block diagram of an alternative baffled treatment tank arrangement.

Referring now to FIG. 6, an alternative arrangement for a baffled tank 44' includes a nanobubble generator 70 disposed at the entrance of the baffled tank 44' that provides an inlet that receives recovered fracture water and an outlet 71b that delivers treated, recovered fracture water. The baffled tank can also have a second inlet (not shown). The nanobubble generator 70 in combination with a plurality of cylindrical nanobubble generators 72 disposed within corresponding ones of baffled compartments 73 adjacent baffles 74 of the tank 44' provide nanobubbles of gas entrapped by coated bubbles. The nanobubble generators 70 and 72 are described in my co-pending U.S. patent application Ser. No. 11/516,973, filed Sep. 7, 2006 entitled "Enhanced Reactive Ozone" and incorporate herein by reference in its entirety and as discussed below. Each of the nanobubble generators 70 and 72 are fed air/ozone and hydrogen peroxide flows, as illustrated for an exemplary one of the nanobubble generators 72 from a manifold 75 or other distribution arrangement. The nanobubble generators 72 are mounted on the side of the baffles 74 and inject hydrogen peroxide coated nanobubbles of air/ozone into the flow stream. The air/ozone/hydrogen peroxide decontaminates the water by decomposing alkanes that are in the water leaving as byproducts, e.g., acetone, alcohol, carbon dioxide, water, and reactive hydro-peroxides with nanobubbles, that retain the reactively of the solution. In this embodiment, the tank 44' is a covered tank that operates under pressure, e.g., 20 psi, and thus includes a pressure relief valve 78. In other embodiments, the tank need not be pressurized or other pressures could be used.

Figure 6A:
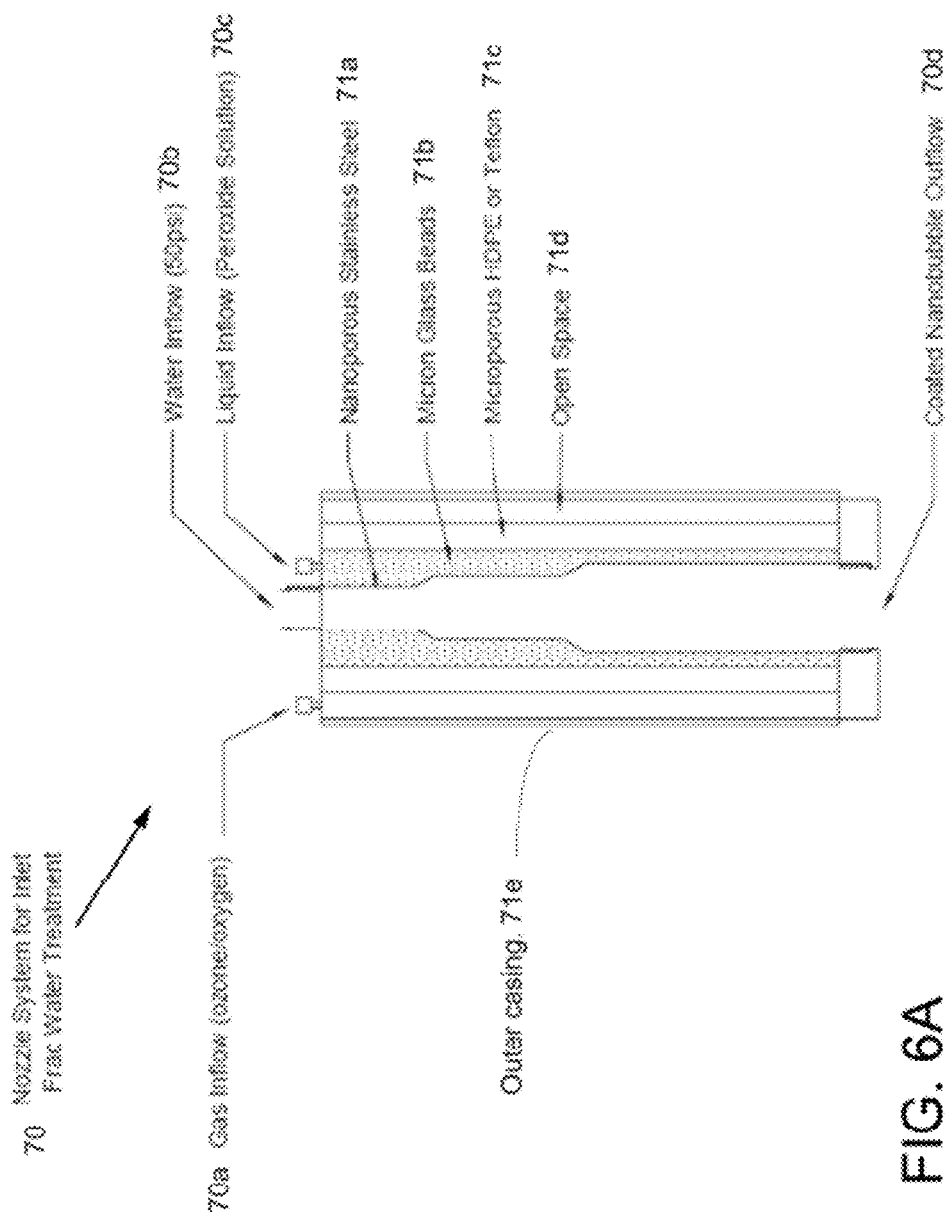
FIG. 6A is a diagram of a venturi type of nozzle for water inlet in the arrangement of FIG. 6.

Referring now to FIG. 6A, an example of the nanobubble generator 70 is shown. The nanobubble generator 70 is of a venturi type, having inlets 70a-70c for gas, water and peroxide, respectively, and an outlet 70d for delivery of coated nanobubbles. An inner tube 71a of nanoporous stainless steel, having successively increasing internal cross sections, as shown to provide a venturi effect is surrounded by a micron glass bead pack 70b that is confined between the tube 71a and a microporous tube 71c. A gap 71d is provided between the microporous tube 71c and an outer casing 71e. Other arrangements are possible. For instance, one such arrangement is described in my issued U.S. Pat. No. 6,913,251, entitled "Deep Well Sparging."

Figure 7:
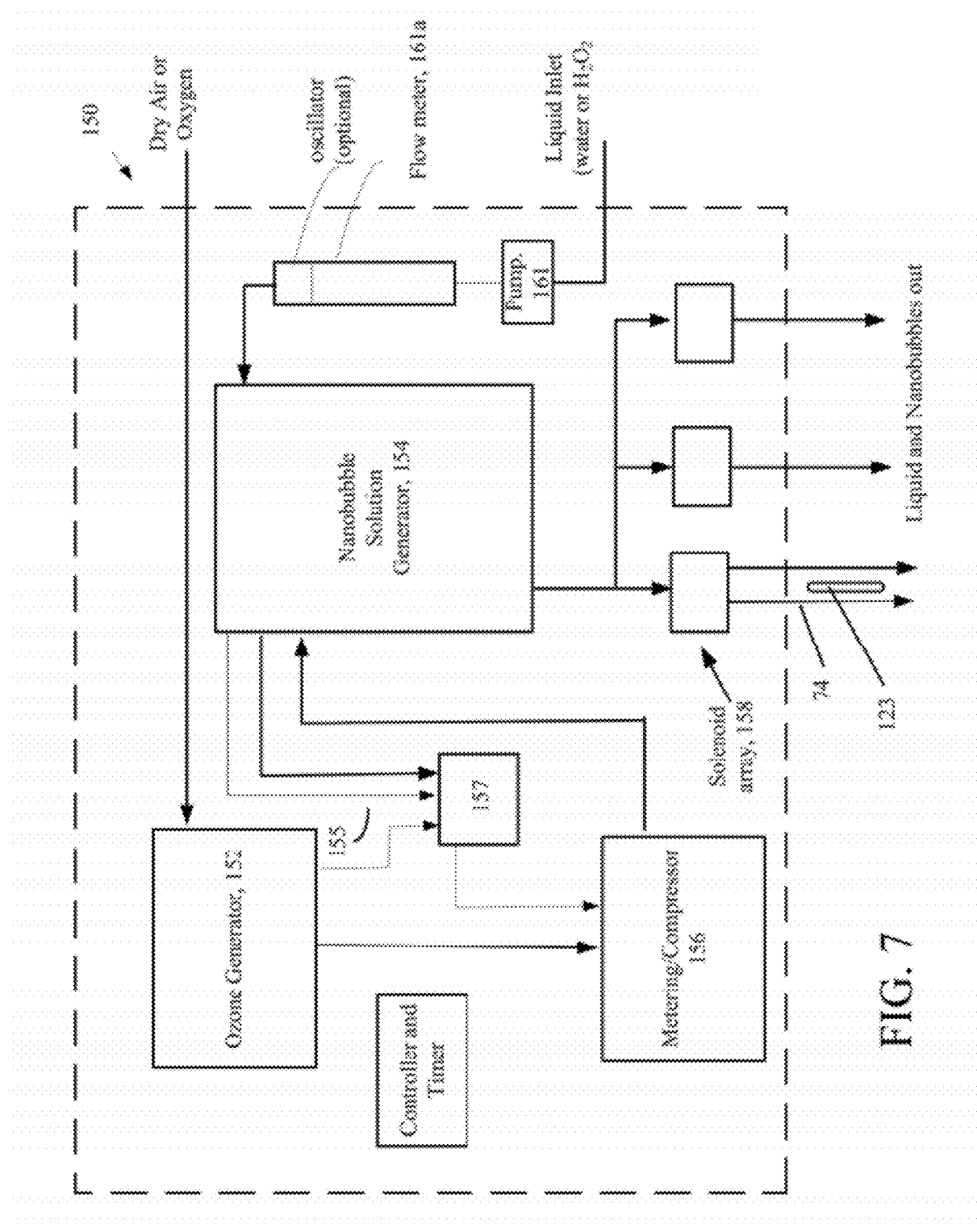
FIG. 7 is a block diagram of an alternative treatment arrangement suitable for use with the arrangement of FIG. 6.

Referring now to FIG. 7, a treatment arrangement suitable for use with the tank of FIG. 6 is shown. The nanobubble generator 70 (similar to nanobubble generator 350 (FIG. 18) that can be deployed in field operations is shown. The nanobubble generator 150 includes an ozone generator 152 fed via, e.g., dry air or oxygen, a nanobubble solution generator 154 fed liquid, e.g., water or hydrogen peroxide and ozone/air or ozone/oxygen from a compressor 156. Liquid is output from the nanobubble solution generator 154 and includes a cloud of nanobubbles, and is delivered to a bank of solenoid controlled valves 158 to feed tubes 72 that can be disposed in the contact tank (FIG. 6). The feed tubes 72 can have acoustic or sonic probes 123 disposed in the tips, as shown. A controller/timer 153 controls the compressor and solenoid control valves. A excess gas line 155 is connected via a check valve 157 between nanobubble solution generator 154 and the line from the ozone generator to bleed off excess air from the nanobubble solution generator 154. A pump is used to deliver the liquid here through a flowmeter with optional oscillator.

The high concentration of alkanes/alkenes and VOCs are treated by techniques that produce nano to micro size bubbles including ozone and oxygen as oxidizing gases entrapped by water and having a liquid coating of a hydroperoxide, e.g., hydrogen peroxide.

In particular, the use of nanobubbles provides a spherical arrangement of ozone, as described in my co-pending application entitled: "Enhanced Reactive Ozone" mentioned above. The spherical arrangement of ozone provides a nano-microbubble distribution that is negatively charged, changing the local surface tension, of the bubble attracting hydrophobic molecules by charge and Henry's partitioning constant from aqueous to gaseous phases. The film regions of the bubbles are highly reactive regions, continually generating hydroxyl and related radicals capable of decomposing the hydrocarbon fractions into small segments which may, in turn, more quickly react with other bubbles surfaces.

The nano to micro bubble generators are configured to both reduce the size of the bubbles, and narrow the range of sizes of the bubbles in the bubble populations. The decrease in size of the bubbles may increase the reactive strength and longevity of the bubbles in the water, thus maintaining the highly reactive form of ozone in water for relatively high lifetimes. In some embodiments, the remaining water is recharged back into fracture wells or retained in storage for return to streams. Thus, the treated water, depending on saline condition, is may be discharged into a river or discharged onto or into land.

However, the treated water, immediately after treatment with ozone and or ozone/peroxide and prior to storage, is reactive, e.g., having an elevated, oxidation reduction potential of at least 100 mv and generally in the range of about 150 to 1000 my or more, and containing a milky-like suspension of nano to microbubbles of similar size. Subjected to re-injection, under pressure, the bubbles may collapse and provide a concomitant release of high levels of chemical energy.

The use of nano-micro size bubble generators produces nanobubble sizes through the properties of charged ozone and peroxide films that modify surface tension and allow such fine bubbles where normally high pressures (200 psi) would be necessary to produce them (if air or nitrogen gas were used). Under fracture well re-injection pressures (>200 psi), the bubbles may collapse. The nano-size micro-size bubble generator produces bubbles having a relatively narrow range of sizes of such nanobubbles. This provides a mechanism analogous to a radioactive chain reaction where most of the bubbles being of similar, relatively small size all collapse in a very rapid sequence. Extreme compression, (as would occur by injection into deep wells or under the influence of an acoustically-focused beam) initiates a collapse of a significant fraction of the population of bubbles. A resulting compression wave caused by the collapse, would initiate compression of neighboring bubbles. The estimated heat of energy released upon collapse could be significant. Weavers, L. et al. (1998) suggested that

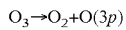

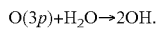

With Pentachlorophenol, invading the gas bubble, $C_p=201$ $Jmol^{-1}K^{-1}$. With these chemical energies, the re-injected fluid would not need surfactant to rapidly remove paraffin fractions that retard either liquid or gas flow in, e.g., fractured shale.

In the chambered baffle tank, the water is subject to pulsed pressure flow of ozone-air gas (up to, e.g., 20 psi). The nano to microbubbles are formed by introducing the oxidizing gas as an air-ozone stream along with introducing a liquid including hydrogen peroxide through, e.g., a laminar Spargepoint® (Kerfoot Technologies, Inc. Mashpee Mass.) or as separate flows to provide the coating of hydrogen peroxide over the bubbles. The bubbles have a diameter of less than e.g., 0.05 microns up to about 200 microns, e.g., 0.05 to 80 microns, 0.1 to 20 microns, and so forth. With the nanobubble generator 150, the range of sizes in the bubbles is narrower.

The ozone gas can be introduced in a cyclic ring form $(O_3)_n$, where n is the number of ozone molecules within a polar ring structure surrounded by a generally sub micron bubble as disclosed in my co-pending U.S. patent application Ser. No. 11/516,973 entitled "Enhanced Reactive Ozone" mentioned above. With hydroperoxide coated microbubbles the nanobubble configuration of the outer film is the cyclic ring form $(O_3)(H_2O_2)_n$, where n is the number of ozone and peroxide molecules within the polar ring structure. For a spherical arrangement, the corresponding equations would be $(O_3)_n^- R \cos \emptyset$ for ozone alone, Where:
R=radius of bubble
$\emptyset$=angle in 3 dimensions
and
n=number of polarized ozone molecules around circumference
$(O_3)^-$=polarized ozone molecule
and $(O_3)_n^-$, $(H_2O_2)_n^- R \cos \emptyset$ for peroxide as a hydroperoxide.

Where:
R=radius of bubble
$\emptyset$=angle in 3 dimensions
n=number of polarized ozone an peroxide molecules around circumference
$(O_3)_n^- (H_2O_2)_n^-$=polarized ozone/peroxide pair The organic-contaminated water comprises primarily petroleum hydrocarbons including alkanes and alkenes. With enhanced reactive ozone and peroxide coating, the stoichiometric ratio of ozone to carbon compound ($C_4$ to $C_{30}$) mineralized approaches a ratio less than 3.0. The stoichiometric ratio of ozone to carbon compound ($C_4$ to $C_{30}$) mineralized approaches a ratio of 1.0 to 1.0. The ozone/oxygen gas is pulsed with a pressure of 0 to 50 psi by a peristaltic or piston pump. The peroxide is pulsed with a pressure of 0 to 50 psi by a piston or peristaltic pump.

The frequency of pulsing varies from 1 to 60 times per hour. Alternatively, the frequency of pulsing varies from 1 to 60 times per minute. Other frequencies are possible. With the nanobubble generators the Laminar point configuration is placed in a pressurized tube, and a magnetic spinner is used to achieve shear velocities along the micro to nanoporous surface. Suspended beads or angular particulates may also be rotated in solution to shear off emerging bubbles and achieve small size. The hydrogen peroxide coating on the microbubbles promotes decomposition by adding a secondary liquid phase reactive interface as volatile compounds enter a gaseous phase.

After removal of VOC compounds and total organic carbon, filtration is done to separate out suspended metals, like fine iron flocculation. Nanobubbles however still persist. The water stream is separated for desalination. Ultrafiltration protects the reverse osmosis unit from being attacked by the nanobubbles. The recombined waters can be recycled down wells or held.

During reintroduction of the treated frac water back into the ground, residual hydroperoxide content of the recharged water continues to react with weathered paraffins to enlarge fracture zones and remove fatty paraffin deposits, liberating additional trapped hydrocarbon product, oil and gas in the ground for recovery and use. Residual acetone and hydroperoxide content of the recharged water improves hydraulic conductivity over untreated water injection.

Treatment Example

A bench scale test was performed on groundwater samples of fracture water. Upon receipt of the samples, they were kept refrigerated until testing began. The purpose of the tests was to evaluate the effects of chemical oxidation on the primary contaminants of concern (COCs): alkanes (GRO), BTEX, and other volatile compounds. Each test included subjecting groundwater contained within a pressure reaction vessel to various injected concentrations of the oxidants ozone and hydrogen peroxide for a period of 180 minutes (3 hrs).

Procedure

Following receipt of the concentration of COCs, injected ozone concentrations were calculated in order to achieve a minimal total molar concentration near the molar concentrations of the COCs. This was done to increase the plausibility of measuring a significant change of mass reductions of the COCs between the two tests. Each enhanced reactive ozone/peroxide test was conducted in a 2-liter glass reaction cell outfitted with a laminar Spargepoint®, temperature probe and sample port. During each test, a stir bar constantly set to 7, was used to suspend and mix the soil in the groundwater. During each test the reaction vessel was under 5 psig of pressure, sparged gases were injected at a rate of 500 mL/minute, and, two liters of groundwater were treated.

The table below has a summary of test parameters and laboratory analyses. Prior to starting each test, groundwater samples were obtained at the start in order to identify starting concentrations, provide similar stoichiometric and oxidation demands between the two tests. Groundwater was allowed to come to room temperature prior to starting the tests to eliminate temperature differential reaction effects. Each test was run for 180 minutes and included a starting stirred solution of 2 liters of homogenized groundwater, Initial ($t_0$) groundwater samples were taken. Following the completion of each test, treated groundwater was collected and immediately containerized according to the type of analyses to be conducted. Following containerization of all groundwater samples, they were immediately cooled/refrigerated to 40° F. until transport to the laboratory. The reaction vessel was decontaminated between each test by rinsing with a hot soapy solution followed by several rinses with distilled water.

Results

Bench scale test laboratory results indicate significant reduction in COCs from groundwater in both tests. Specifically, the tables below summarizes analytical findings, mass changes, mass removals, and percentage mass removed as a result of each test.

Reviewing these Data Suggest the Following:

The most efficient groundwater mass reduction of the COCs occurred as a result of the performance of test #1 (ozone @ 1,500 ppmV and peroxide @ 10%): An approximate range of 88% to 96% mass of the Gasoline Range Organics (GRO) were removed; 99+% of the BTEX and related VOCs were removed. A slight rise in acetone occurred. The mean value lies just below the permissible level for surface water discharge.

Ideally, the decay curves indicate a reaction time of 4 hours would yield values equal to or less than guidelines for discharge of organics to general surface waters (no floating product, emulsified oil and grease—less than 10 mg/L, with VOCs and SVOCs below detectable levels.

The Table I of bench-scale results is set forth below along with the original characterization Table II of the fracture wastewater and floating (NAPL) product. Of interest, after 3-4 days of standing, the vials became clear (FIG. 1) with a small heavier-than-water (DNAPL) precipitating out. Analytical review of the less than 0.05% DNAPL, colored red, suggests a high weight heavy paraffin, probably over 40 carbon. This can be filtered out, normally using 45 micron bag-like filters. The heavier paraffins, like candle wax are not considered a health problem organic.

TABLE 1

Fracture Water Bench-Scale Test, 2-Liter Aqueous Sample 1500 ppmv ozone, 2 ml/min 10% peroxide, 5 psi

| VOCs | Start 1FW1 | 1 Hr. 1FW2 | 2 Hr. 1FW3 | End (3 Hr.) 1FW4 |
|---|---|---|---|---|
| Benzene | 360 | ND | ND | ND |
| Toluene | 2400 | 200 | ND | ND |
| Ethylbenzene | 460 | 53 | ND | ND |
| Xylenes p/m-xylene | 5000 | 380 | 120 | ND |
| o-xylene | 1100 | 150 | 120 | ND |
| 1,3,5 Trimethylbenzene | 2100 | ND(<250) | ND | ND |
| 1,2,4 Trimethylbenzene | 2200 | ND(<250) | ND | ND |
| Isopropylbenzene | 140 | ND(<50) | ND | ND |
| p-Isopropyltoluene | 200 | ND(<50) | ND | ND |
| n-Propylbenzene | 240 | ND(<250) | ND | ND |
| Acetone | 1100 | 2100 | 2600 | 2000 |
| GRO | 180,000 | 120,000 | 57,000 | 22,000 |

6000 ppmv ozone, 2 ml/min 10% peroxide, 5 psi

| | 2FW1 | 2FW2 | 2FW3 | 2FW4 |
|---|---|---|---|---|
| Benzene | 310 | 80 | ND | ND |
| Toluene | 160 | 450 | ND | ND |
| Ethylbenzene | 240 | 75 | ND | ND |
| Xylenes p/m-xylene | 2600 | 790 | 150 | ND |
| o-xylene | 570 | 210 | ND | ND |
| 1,3,5 Trimethylbenzene | 550 | ND | ND | ND |
| 1,2,4 Trimethylbenzene | 1100 | 360 | ND | ND |
| Isopropylbenzene | 70 | ND | ND | ND |
| p-Isopropyltoluene | 90 | ND | ND | ND |
| n-Propylbenzene | 110 | ND | ND | ND |
| Acetone | 1100 | 2700 | 2500 | 2100 |
| GRO | 280,000 | 100,000 | 38,000 | 12,000 |

TABLE II

Analysis: Product and Aqueous (water) Fraction Analyzed
Product: Petroleum Hydrycarbons C8 to C30 (Similar to aviation/jet fuel)
Contains:

| | | |
|---|---|---|
| | Toluene | .019 |
| | Xylenes | .045 |
| (est.) | Benzene | .009 |
| (est.) | Ethylbenzene | .007 |
| (est.) | Trimethylbenzene | .018 |

TABLE II-continued

| | | |
|---|---|---|
| (est.) | Acetone | .005 |

(est. from aqueous fraction by proportion)
TPH 70% alkanes C6 to C30 15% VOCs (BTEX, etc.)
No PAHs found

| Aqueous Fraction: | |
|---|---|
| VOCs (µg/L) | |
| Benzene | 370 |
| Toluene | 1800 |
| Ethylbenzene | 230 |
| p/m Xylene | 2600 |
| o Xylene | 540 |
| Acetone | 1100 |
| n-Butylbenzene | 140 |
| sec-Butylbenzene | 41 |
| Isopropylbenzene | 63 |
| p-Isopropyltoluene | 84 |
| n-Propylbenzene | 98 |
| 1,3,5 Trimethylbenzene | 920 |
| 1,2,4 Trimethylbenzene | 1000 |
| SVOCs | ND (Nondetect) Petroleum Hydrocarbons GC-GRO Gasoline-range organics 380,000 µg/L GC-DRO Diesel-range organics 182,000 µg/L |

| Metals (in aqueous) | |
|---|---|
| Copper, total | .041 mg/L |
| Iron, total | 11 mg/L |
| Lead, total | ND |
| Manganese, total | 1.84 mg/L |
| Zinc, total | .072 mg/L |

Pilot Testing

Test runs were conducted on fracture water hauled to a pilot test system. The total dissolved solids (TDS) ranged from a high of 40,000 mg/L to a low of 8,700 mg/L. The mean value of all samples (measured as specific conductance, converted to TDS equivalents) was 20,694 mg/L, Five of the twelve samples fell above, while seven fell at or below 20,000 mg/L TDS. While salinity adjustment may be needed, a seawater treatment system should be adequate and could be made to operate only as needed for final polishing (to less than 20,000 mg/L TDS) summarized in Table III below.

Treatment efficiency in the pilot testing confirms the observed bench-scale efficiencies, discussed above. Organic removal was about 94-98% removal. Because the TPH (total petroleum hydrocarbons) is running in the thousandths instead of hundred thousandths of ug/L, reduction to less than 200 µg/L was common. Benzene has also been reduced below MCLs in a number of cases. Considering the pickup in efficiencies expected with stainless steel nano to micro Laminar points, the volume flow may be able to be increased to, e.g., 80,000 gpd (gallons per day) instead of 60,000 gpd.

The lower mean organic mass obtained by drawing liquid below tank tops and after oil/water separation can reduce the requirement for peroxide flow. Some of the lower values are treatable with ozone alone. An FID (flame ionization detector) sensor can be provided to scan the flow as the flow enters the chambered baffle tank.

Iron is effectively removed by the system (97-99.4%). At a flow of 270,000 liters per day and 40 mg/L total Fe, iron precipitates out, as a floculate at 10,800 gms or 23.8 lbs. of iron per day or about a ton per 100 operating days. If ultra-filtration/reverse osmosis treatment is needed to remove salt, the treatment would yield about one ton/day (2000 lbs) for reduction of 30,000 ppm to 10,000 ppm TDS.

Flows of 6,000 to 60,000 gpd Frac Water:

TABLE III

| Input | Output | Partial UF/RO Treatment (as needed) |
|---|---|---|
| TPH 200-180,000 ug/L | <2000 ug/L | <1000 ug/L |
| BTEX 100-9,000 ug/L | <20 ug/L | <10 ug/L |
| TDS 6,000-30,000 mg/L | <20,000 mg/L | <10,000 mg/L |
| Iron 10-200 mg/L | <.1 mg/L | <.01 mg/L |

Enhanced Reactive Ozone

Figure 9:
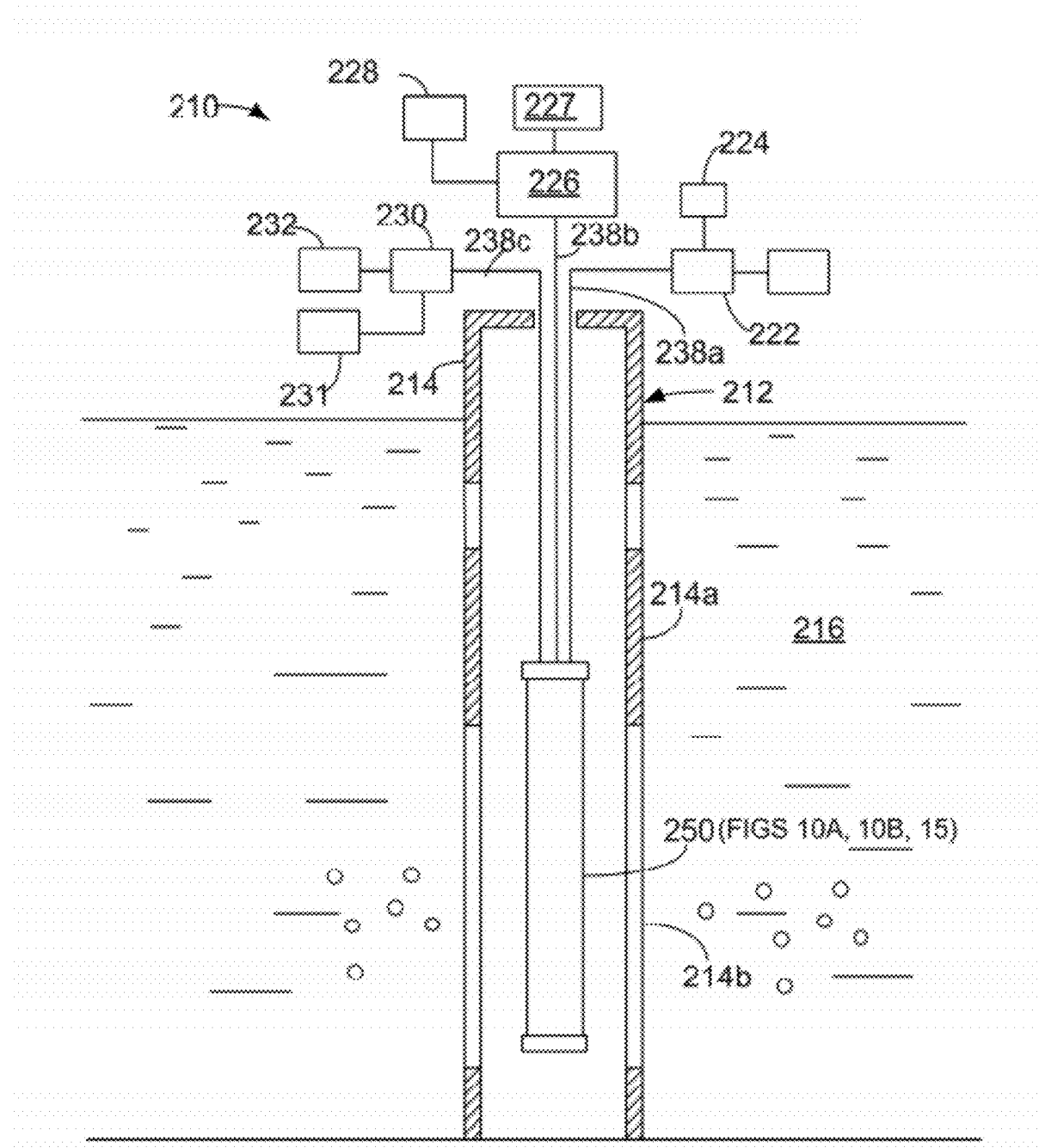
FIG. 9 is a cross-sectional view showing a sparging treatment system.
Figure 15:
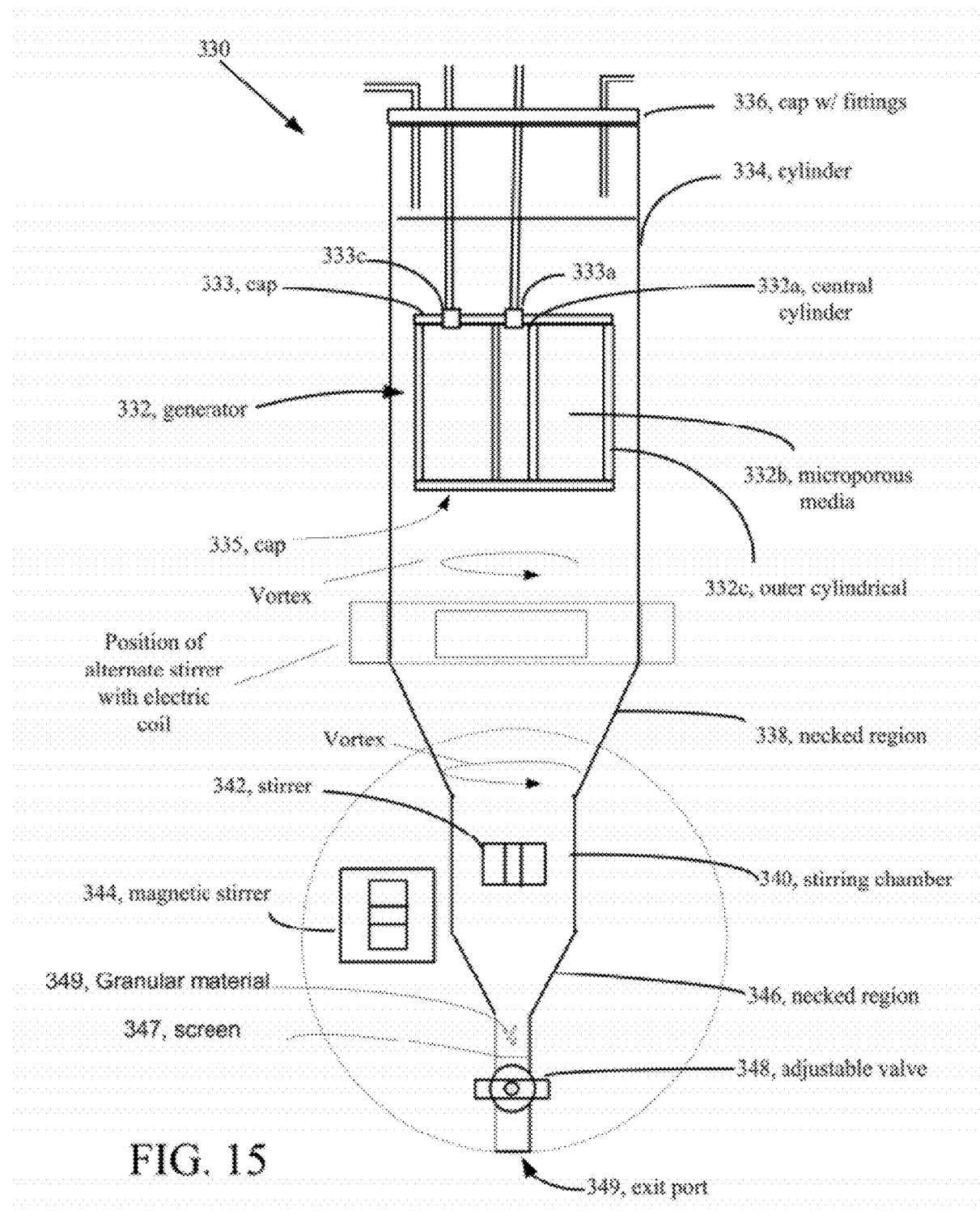
FIG. 15 is a diagrammatical, longitudinal cross-section view of an alternative multi-fluid diffuser useful in the arrangements of FIGS. 1, 2 and 6.

Referring now to FIG. 9, a sparging arrangement 210 for use with plumes, sources, deposits or occurrences of contaminants, is shown. The arrangement 210 is disposed in a well 212 that has a casing 214 with an inlet screen 214a and outlet screen 214b to promote a re-circulation of water into the casing 214 and through the surrounding ground/aquifer region 216. The casing 214 supports the ground about the well 12. Disposed through the casing 214 are one or more multi-fluid diffusers, e.g., 50, 250' (discussed in FIGS. 3 and 4) or alternatively in some applications the multi-fluid diffuser 330 (FIG. 15).

The arrangement 210 also includes a first pump or compressor 222 and a pump or compressor control 224 to feed a first fluid, e.g., a gas such as an ozone/air or oxygen enriched air mixture, as shown, or alternatively, a liquid, such as, hydrogen peroxide or a hydroperoxide, via feed line 238a to the multi-fluid diffuser 250. The arrangement 210 includes a second pump or compressor 226 and control 227 coupled to a source 228 of a second fluid to feed the second fluid via feed line 2238b to the multi-fluid diffuser 250. A pump 230, a pump control 231, and a source 232 of a third fluid are coupled via a third feed 238c to the multi-fluid diffuser 250.

The arrangement 210 can supply nutrients such as catalyst agents including iron containing compounds such as iron silicates or palladium containing compounds such as palladized carbon. In addition, other materials such as platinum may also be used.

Figure 11:
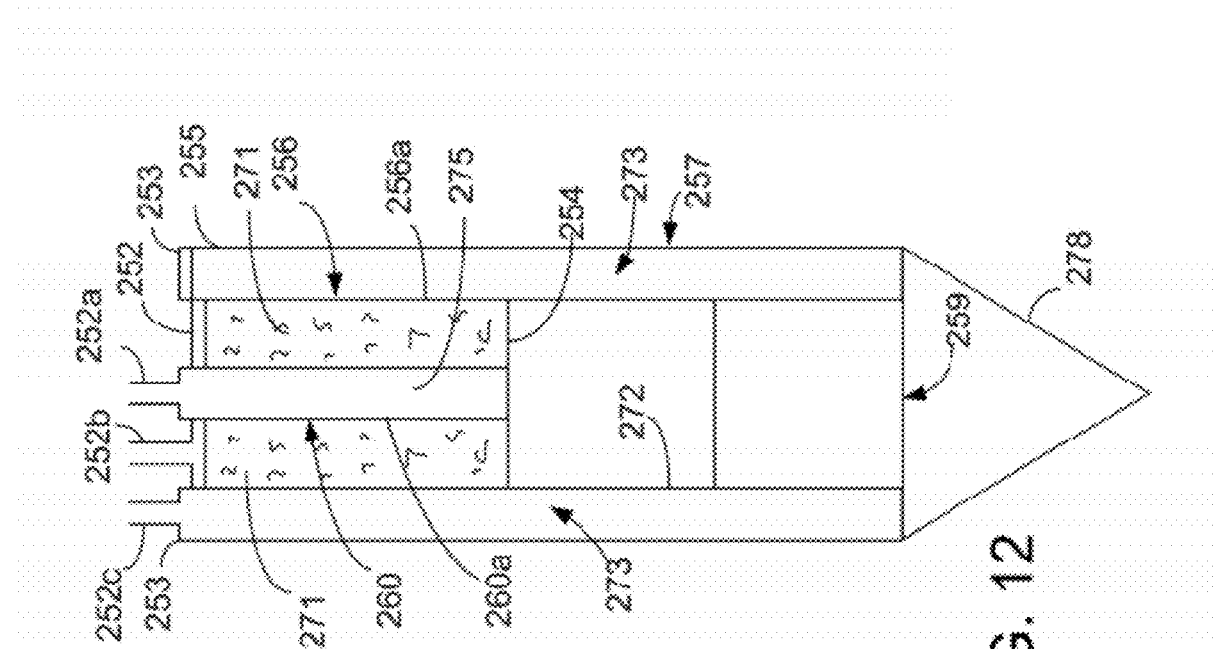
FIG. 11 is a longitudinal cross-section view of a multi-fluid diffuser useful in the arrangement of FIG. 9.

The arrangement 210 makes use of a laminar multi-fluid diffuser 250 (FIG. 11 or FIG. 4). The laminar multi-fluid diffuser 250 allows introduction of multiple, fluid streams, with any combination of fluids as liquids or gases. The laminar multi-fluid diffuser 250 has three inlets. One of the inlets introduces a first gas stream within interior regions of the multi-fluid diffuser, a second inlet introduces a fluid through porous materials in the laminar multi-fluid diffuser 250, and a third inlet introduces a third fluid about the periphery of the laminar multi-fluid diffuser 250. The fluid streams can be the same materials or different.

In the embodiment described, the first fluid stream is a gas such as an ozone/air mixture, the second is a liquid such as hydrogen peroxide, and the third is liquid such as water. The outward flow of fluid, e.g., air/ozone from the first inlet 252a results in the liquid, e.g., the hydrogen peroxide in the second flow to occur under a siphon condition developed by the flow of the air/ozone from the first inlet 252a.

Alternatively, the flows of fluid can be reversed such that, e.g., air/ozone from the second inlet 252a and the liquid, e.g., the hydrogen peroxide flow from first inlet, to have the ozone stream operate under a siphon condition, which can be used to advantage when the arrangement is used to treat deep deposits of contaminants. The ozone generator operating under a siphon condition is advantageous since it allows the ozone generator to operate at optimal efficiency and delivery of optimal amounts of ozone into the well, especially if the ozone generator is a corona discharge type. In this embodiment, the third fluid flow is water. The water is introduced along the periphery of the multi-fluid diffuser 250 via the third inlet.

Figure 10:
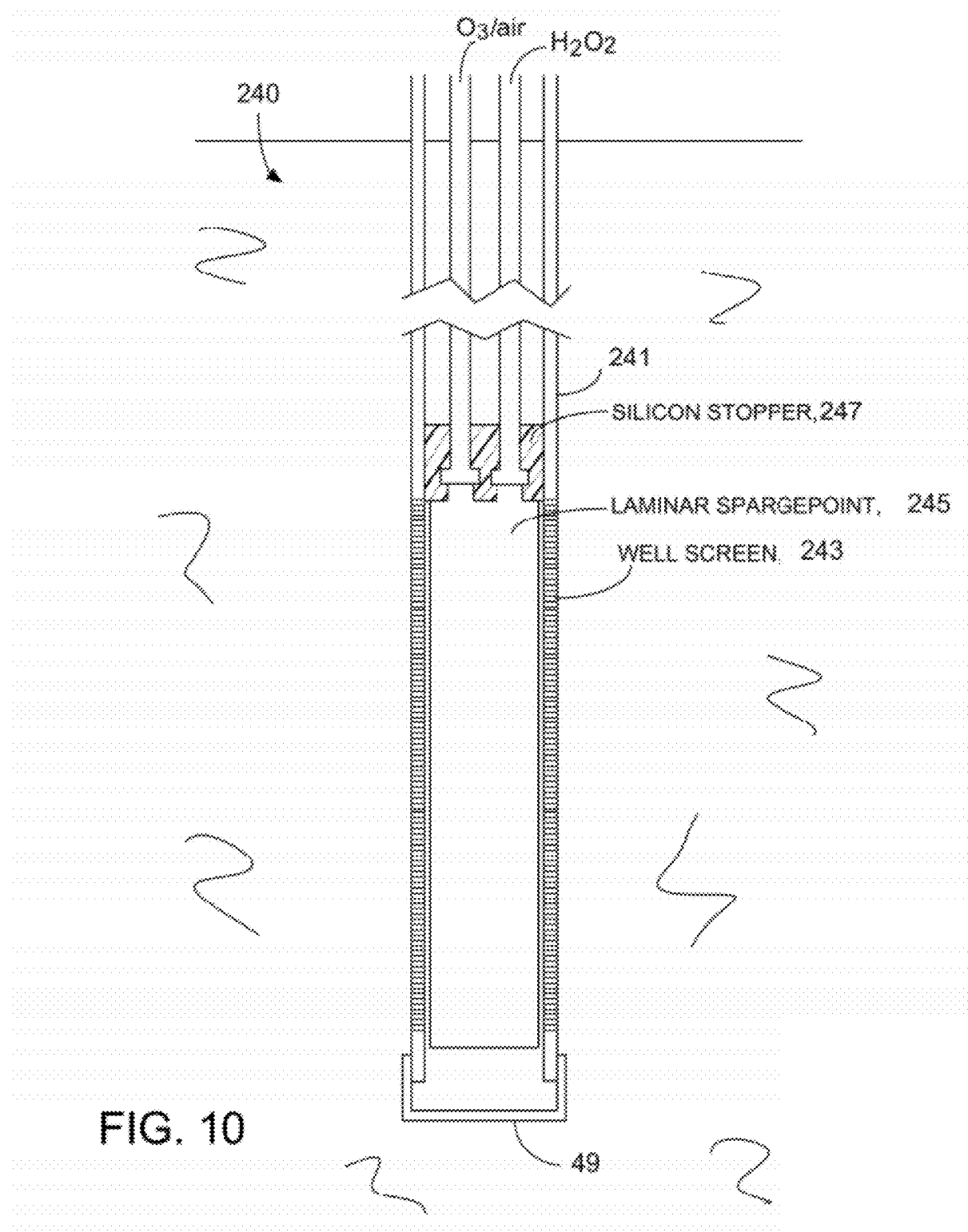
FIG. 10 is a cross-sectional view showing a sparging treatment system with well screen and a multi-fluid diffuser.

Referring to FIG. 10, an alternate arrangement 240 to produce the fine bubbles is shown. A well casing 241 is injected or disposed into the ground, e.g., below the water table. The casing 241 carries, e.g., a standard 10-slot well-screen 243. A laminar microporous diffuser 245 is disposed into the casing 241 slightly spaced from the well screen 243. A very small space is provided between the laminar microporous diffuser 245 and the 10-slot well screen. In one example, the laminar microporous diffuser 245 has an outer diameter of 2.0 inches and the inner diameter of the well casing is 2.0 inches. The laminar microporous diffuser 245 is constructed of flexible materials (described below) and as the laminar microporous diffuser 245 is inserted into the casing 241 it flexes or deforms slightly so as to fit snugly against the casing 241. In general for a 2 inch diameter arrangement a tolerance of about +/−0.05 inches is acceptable. Other arrangements are possible. The bottom of the casing 241 is terminated in an end cap. A silicon stopper 247 is disposed over the LAMINAR SPARGEPOINT® type of microporous diffuser available from Kerfoot Technologies, Inc. and also described in U.S. Pat. No. 6,436,285. The silicone stopper 247 has apertures to receive feed lines from the pumps (as in FIG. 9, but not shown in FIG. 10).

Exemplary operating conditions are set forth in Table IV.

For In-Situ Type Applications

TABLE IV

| Unit | Air | Ozone gm/day | Hydroperoxide gal/day | Water Flow gal/min | Recirculation Wells | Laminar microporous diffuser with screen | Operating pressure (psi) |
|---|---|---|---|---|---|---|---|
| Wall mount | 3-5 cfm | 144-430 | 5-50 | 1-3 | 1-4 | 1-8 | 0-30 |
| Palletized | 10-20 cfm | 300-1000 | 20-200 | 1-10 | 1-8 | 1-16 | 0-100 |
| Trailer | 20-100 cfm | 900-5000 | 60-1000 | 1-50 | 1-20 | 1-40 | 0-350 |

Flow rates are adjusted to a pressure that offsets groundwater hydraulic head and formation backpressures. In general, pressures of, e.g., above 40 psi ambient are avoided so as to prevent fracture or distortion of microscopic flow channels. The percent concentration of hydroperoxide in water is typically in a range of 2-20 percent, although other concentrations can be used. The flow is adjusted according to an estimate of the total mass of the contaminants in the soil and water. If high concentrations (e.g., greater than 50,000 parts per billion in water or 500 mg/kg in soil) of the contaminants are present, sufficient hydroperoxides are added to insure efficient decomposition by the Criegee reaction mechanism or hydrogen peroxide to augment hydroxyl radical formation.

Extremely fine bubbles from an inner surface of the microporous gas flow and water (including a hydroperoxide, e.g., hydrogen peroxide) are directed by lateral laminar flow through the porous material or closed spaced plates (FIG. 10). The gas to water flow rate is held at a low ratio, e.g., sufficiently low so that the effects of coalescence are negligible and the properties of the fluid remain that of the entering water.

Alternatively, the water flow is oscillated (e.g., pulsed), instead of flowing freely, both to reduce the volume of water required to shear, and maintain the appropriate shear force at the interactive surface of the gas-carrying microporous material. Johnson et al., Separation Science and Technology, 17(8), pp. 1027-1039, (1982), described that under non-oscillating conditions, separation of a bubble at a microporous frit surface occurs when a bubble radius is reached such that drag forces on the bubble equal the surface tension force $\pi D\delta$, as:

$$C_D \left[ \frac{\rho U_o^2 A_p}{2} \right] = \pi D \delta$$

where $C_D$ is the constant analogous to the drag coefficient, $\rho$ is the fluid density, $U_o^2$ is the fluid velocity, $A_p$ is the projected bubble area, $\pi$ is pi, 3.14, a constant, $\delta$ is the gas-water surface tension, and D is the pore diameter of the frit. A bubble is swept from the microporous surface when the bubble radius is reached such that the dynamic separating force due to drag equals the retention force due to surface tension. Bubble distributions of 16 to 30μ, (micron) radius and 1 to $4 \times 10^6$ bubbles/min can be produced with a gas flow rate of 8 cm$^3$/min and rotational water flow rates of 776 cm$^3$/min across a microporous surface of μ (micron) pore size with a 3.2 cm diameter surface area. If the flow of liquid is directed between two microporous layers in a fluid-carrying layer, not only is a similar distribution of microbubble size and number of microbubbles produced, but, the emerging bubbles are coated with the liquid which sheared them off.

In order to decompose certain dissolved recalcitrant compounds, a stronger oxidation potential is necessary for reaction. Ozone in the dissolved form is a recognized strong reagent for dissolved organics but has a short 15 to 30 minute half-life. By reducing the size of gas bubbles to the point where the vertical movement is very low, ozone in a gaseous form can co-exist with dissolved forms as a homogenous mixture. The half-life of gaseous ozone is much longer than dissolved forms, ranging 1 to 20 hours. As the bubbles of ozone become nano size, the surface area to volume ratio exceeds 1.0 and approaches ranges of 5 to 30, thus providing an exceptional capacity to withdraw smaller saturated molecules towards the surfaces from Henry's partitioning. However, the behavior of the nanobubble ozone indicates a new form of ozone where the resonating triatom orients itself to form a membrane which changes surface tension within the water. This allows the production of nano-sized bubbles of ozone which cannot be produced by using air or nitrogen gas under similar conditions of gas flow shear and pressure.

Characteristics of varying sizes bubbles entrapping ozone are depicted in Table V.

TABLE V

| Diameter (microns) | Surface Area $4\pi r^2$ | Volume $4/3 \pi r^3$ | Surface Area/ Volume |
|---|---|---|---|
| 200 | 124600 | 4186666 | .03 |
| 20 | 1256 | 4186 | 0.3 |
| 2 | 12.6 | 4.2 | 3.2 |
| .2 | .13 | .004 | 32 |

In addition to using a continual flow of fluid to shear the outside surfaces on the cylindrical generator, the liquid can be oscillated (pulsed) at a frequency sufficient to allow for fluid replacement in the microporous diffuser, for the volume of liquid removed as coatings on the bubbles, but not allowing interruption of the liquid/bubble column on its way to the surface (or through a slit, e.g., well screen slot). To avoid coalescing of the microbubbles, a continual stream of micro to nanobubbles, actually coated with the peroxide liquid is emitted from the surface of the laminated generator.

Some examples of gas flows and liquid volumes are listed below in Table VI for each of the examples described in FIGS. 1 and 2.

TABLE VI

Per 8 cm surface area, (5 Pm (micron) porosity)

| Rotational Water Flow rates 10 cm³/min gas | Mean Bubble size (Pm) | Bubble size range (Pm) | Rotative Frequency bubbles/min |
|---|---|---|---|
| 250 cm³/min | 30 | 16-60 | 4 × 10⁶ |
| 500 cm³/min | 20 | 16-50 | 7 × 10⁶ |
| 800 cm³/min | 15 | 8-30 | 15 × 10⁶ |
| 3500 cm³/min | 10 | 5-15 | 30 × 10⁶ |
| 3000 cm³/min | 5 | .5-10 | 50 × 10⁶ |
| 5000 cm³/min | 2 | .2-6 | 80 × 10⁶ |
| 5000 cm³/min | <1 | .1-5 | 100 × 10⁶ |

For an equivalent LAMINAR SPARGEPOINT® type of microporous diffuser available from Kerfoot Technologies, Inc. (formally KV-Associates (2 INCH OUTER DIAMETER)

For Laminar Spargepoint®
Porous Surface Area is 119 sq. in. (771 sq.cm.)
Gas flow 25000 cm³/min (25 l/min) or (0.8825 cu.ft/min) =52.9 cu.ft./hr.
(20 cfm)=1200 cu.ft./hr
(L×0.264=gallons)
Liquid Flow
If continuous: 625 l/min (165 gallons/min) or 2000 gallons/day
If oscillate: 5 gallons/day
The liquid is supplied with a Pulsafeeder® pulsing peristaltic pump to oscillate the liquid (5 psi pulse/sec) and to deliver an adjustable 0.1 to 10 liters/hour (7 to 60 gallons/day). Table VII depicts exemplary gas flow and water rates.

TABLE VII

TWO LAMINAR MICROPOROUS MATERIALS OSCILLATING GAS

| GAS FLOW 50 scf | WATER FLOW 200-800 ccm/min | BUBBLE SIZE (Pm) | FREQUENCY Bubbles/min. |
|---|---|---|---|
| 1 cfm | 1 L/min (.26 gallons/min) | 5 Pm | 10 × 10⁸ |
| 3 cfm | 3 L/min (.78 gallons/min) | 5 Pm | 10 × 10⁸ |
| 30 cfm[1] | 30 L/min (7.8 gallons/min) | 5 Pm | 10 × 10⁸ |

(2 inch 800 sq. cm. LAMINAR SPARGEPOINT ® type of microporous diffuser available from Kerfoot Technologies, Inc. [1]Would require ten (10) LAMINAR SPARGEPOINT ® type of microporous diffuser for operation, or increase length or diameter of the microporous diffuser).

For insertion of the LAMINAR SPARGEPOINT® type of microporous diffuser into well screens or at depth below water table, the flow of gas and liquid is adjusted to the back pressure of the formation and, for gas reactions, the height (weight) of the water column. At ambient conditions (corrected for height of water column), the liquid fraction is often siphoned into the exiting gas stream and requires no pressure to introduce it into the out flowing stream. The main role of an oscillating liquid pump is to deliver a corresponding flow of liquid to match a desired molar ratio of ozone to hydrogen peroxide for hydroxyl radical formation as:

$$2O_3 + H_2O_2 = 2OH_{\cdot} + 3O_2$$

Set out below are different operating conditions for different types of systems available from Kerfoot Technologies, Inc. (formally KV-Associates, Inc.) Mashpee Mass. Other systems with corresponding properties could be used.

Walimount Unit
Pressure range, injection: 10 to 40 psi
Gas flow: 1-5 Scfm (50 to 100 ppmv ozone)
Liquid range: 0.03-0.5 gallons/hr. (55 gallon tank) (3 to 8% peroxide).
Shearing fluid (water)
Palletized Units
Pressure range-injection: 10 to 100 psi
Gas flow: 0-20 cfm (50 to 2000 ppmv ozone)
Liquid range: 0-5 gallons/hr (3 to 9% peroxide)
Shearing fluid (water)
Trailer Units
Pressure range-injection: 10 to 350 psi
Gas flow: 0-100 cfm (50 to 10,000 ppmv ozone)
Liquid range: 0-20 gallons/hr (3 to 9% peroxide)
Shearing fluid (water)
The process involves generation of extremely fine microbubbles (sub-micron in diameter up to less than about 5 microns in diameter) that promote rapid gas/gas/water reactions with volatile organic compounds. The production of microbubbles and selection of appropriate size distribution optimizes gaseous exchange through high surface area to volume ratio and long residence time within the material to be treated. The equipment promotes the continuous or intermittent production of microbubbles while minimizing coalescing or adhesion.

The injected air/ozone combination moves as a fluid of such fine bubbles into the material to be treated. The use of microencapsulated ozone enhances and promotes in-situ stripping of volatile organics and simultaneously terminates the normal reversible Henry's reaction.

The basic chemical reaction mechanism of air/ozone encapsulated in micron-sized bubbles is further described in several of my issued patents such as U.S. Pat. No. 6,596,161 "Laminated microporous diffuser"; U.S. Pat. No. 6,582,611 "Groundwater and subsurface remediation"; U.S. Pat. No. 6,436,285 "Laminated microporous diffuser"; U.S. Pat. No. 6,312,605 "Gas-gas-water treatment for groundwater and soil remediation"; and U.S. Pat. No. 5,855,775, "Microporous diffusion apparatus" all of which are incorporated herein by reference.

The compounds commonly treated are HVOCs (halogenated volatile organic compounds), PCE, TGE, DCE, vinyl chloride (VC), EDB, petroleum compounds, aromatic ring compounds like benzene derivatives (benzene, toluene, ethylbenzene, xylenes). In the case of a halogenated volatile organic carbon compound (HVOC), PCE, gas/gas reaction of PCE to by-products of HCl, $CO_2$ and $H_2O$ accomplishes this. In the case of petroleum products like BTEX (benzene, toluene, ethylbenzene, and xylenes), the benzene entering the bubbles reacts to decompose to CO2 and H2O. In addition, through the production of hydroxyl radicals (.OH) or perhydroxyl radicals (.OOH) or atomic oxygen O ($^3$P) from sonic enhancement, additional compounds can be more effectively attacked, like acetone, alcohols, the alkanes and alkenes.

Also, pseudo Criegee reactions with the substrate and ozone appear effective in reducing saturated olefins like trichloro ethane (1,1,1-TCA), carbon tetrachloride ($CCl_4$), chloroform and chlorobenzene, for instance.

Other contaminants that can be treated or removed include hydrocarbons and, in particular, volatile chlorinated hydrocarbons such as tetrachloroethene, trichloroethene, cisdichloroethene, transdichloroethene, 1-1-dichloroethene and vinyl chloride. In particular, other materials can also be removed including chloroalkanes, including 1,1,1 trichloroethane, 1,1, dichloroethane, methylene chloride, and chloroform, O-xylene, P-xylene, naphthalene and methyltetrabutylether (MTBE) and 1,4 Dioxane.

Ozone is an effective oxidant used for the breakdown of organic compounds in water treatment. The major problem in effectiveness is that ozone has a short lifetime. If ozone is mixed with sewage containing water above ground, the half-life is normally minutes. To offset the short life span, the ozone is injected with multi-fluid diffusers 50, enhancing the selectiveness of action of the ozone. By encapsulating the ozone in fine bubbles, the bubbles would preferentially extract volatile compounds like PCB from the mixtures of soluble organic compounds they encountered. With this process, volatile organics are selectively pulled into the fine air bubbles. The gas that enters a small bubble of volume ($4\pi r^3$) increases until reaching an asymptotic value of saturation.

The Following Characteristics of the Contaminants Appear Desirable for Reaction:

Henry's Constant: $10^{-1}$ to $10^{-5}$ atm-m$^3$/mol

Solubility: 10 to 10,000 mg/l

Vapor pressure: 1 to 3000 mmHg

Saturation concentration: 5 to 100 g/m$^3$

The production of micro to nano sized bubbles and of appropriate size distribution are selected for optimized gas exchange through high surface area to volume ratio and long residence time within the area to be treated.

Referring now to FIG. 11, a multi-fluid diffuser 250 is shown. The multi-fluid diffuser 250 includes inlets 252a-252c, coupled to portions of the multi-fluid diffuser 250. An outer member 255 surrounds a first inner cylindrical member 256. Outer member 255 provides an outer cylindrical shell for the multi-fluid diffuser 250. First inner cylindrical member 256 is comprised of a hydrophobic, microporous material. The microporous material can has a porosity characteristic less than 200 microns in diameter, and preferable in a range of 0.1 to 50 microns, most preferable in a range of 0.1 to 5 microns to produce nanometer or sub-micron sized bubbles. The first inner member 256 surrounds a second inner member 260. The first inner member 256 can be cylindrical and can be comprised of a cylindrical member filled with microporous materials. The first inner member 256 would have a sidewall 56a comprised of a large plurality of micropores, e.g., less than 200 microns in diameter, and preferable in a range of 0.1 to 50 microns, most preferable in a range of 0.1 to 5 microns to produce nanometer or sub-micron sized bubbles.

A second inner member 260 also cylindrical in configuration is coaxially disposed within the first inner member 256. The second inner member 260 is comprised of a hydrophobic material and has a sidewall 260a comprised of a large plurality of micropores, e.g., less than 200 microns in diameter, and preferable in a range of 0.1 to 50 microns, most preferable in a range of 0.1 to 5 microns to produce nanometer or sub-micron sized bubbles. In one embodiment, the inlet 252a is supported on an upper portion of the second inner member 260, and inlets 252b and 252c are supported on a top cap 252 and on a cap 253 on outer member 255. A bottom cap 259 seals lower portion of outer member 255.

Thus, proximate ends of the cylindrical members 256 and 260 are coupled to the inlet ports 252b and 252a respectively. At the opposite end of the multi-fluid diffuser 250 an end cap 254 covers distal ends of cylindrical members 256 and 260. The end cap 254 and the cap 252 seal the ends of the multi-fluid diffuser 250. Each of the members 255, 256 and 260 are cylindrical in shape.

Member 255 has solid walls generally along the length that it shares with cylindrical member 260, and has well screen 257 (having holes with diameters much greater than 200 microns) attached to the upper portion of the outer member. Outer member 255 has an end cap 59 disposed over the end portion of the well-screen 257. The multi-fluid diffuser 250 also has a member 272 coupled between caps 254 and 257 that provide a passageway 273 along the periphery of the multi-fluid diffuser 250. Bubbles emerge from microscopic openings in sidewalls 260a and 256a, and egress from the multi-fluid diffuser 250 through the well screen 257 via the passageway 273.

Thus, a first fluid is introduced through first inlet 252a inside the interior 275 of third member 260, a second fluid is introduced through the second inlet 252b in region 71 defined by members 256 and 260, and a third fluid is introduced through inlet 252c into an outer passageway 273 defined between members 253, 255, 256, and 259. In the system of FIG. 9, the first fluid is a gas mixture such as ozone/air that is delivered to the first inlet through central cavity 275. The second fluid is a liquid such as hydrogen peroxide, which coats bubbles that arise from the gas delivered to the first inlet, and the third fluid is a liquid such as water, which is injected through region 273 and acts as a shearing flow to shear bubbles off of the sidewall 256a. By adjusting the velocity of the shearing fluid, bubbles of very small size can be produced (e.g., sub-micron size). Of course adjusting the conditions and porosity characteristics of the materials can produce larger size bubbles.

Figure 12:
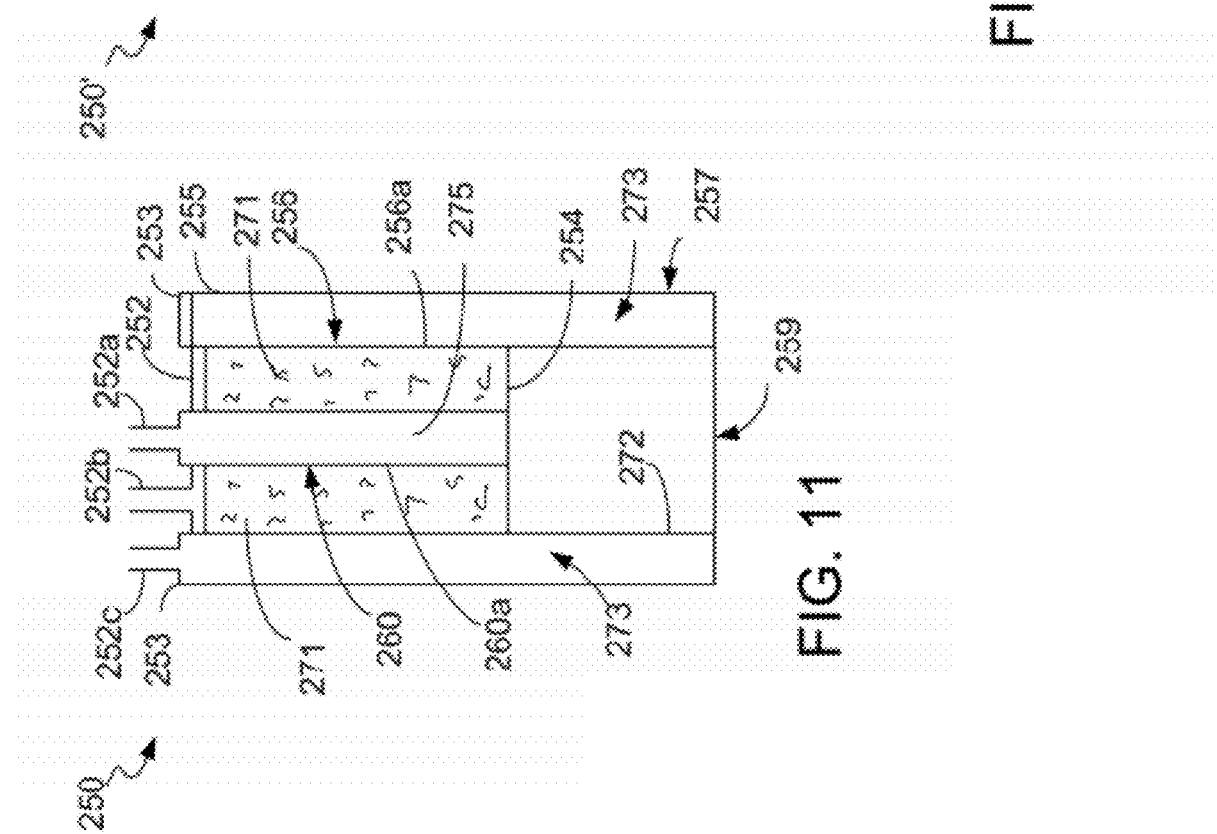
FIG. 12 is a longitudinal cross-section view of an alternative multi-fluid diffuser useful in direct injection into shallow contaminant formations.

Referring to FIG. 12, an alternative embodiment 2250' has the cylindrical member 256 terminated along with the member 260 by a point member 278. The point member 278 can be used to directly drive the multi-fluid diffuser into the ground, with or without a well. The point member can be part of the cap 259 or a separate member as illustrated.

The multi-fluid diffuser 250 or 250' is filled with a microporous material in the space between members 256 and 260. The materials can be any porous materials such as microbeads with mesh sizes from 20 to 200 mesh or sand pack or porous hydrophilic plastic to allow introducing the second fluid into the space between the members 256 and 260.

In operation, the multi-fluid diffuser 250 is disposed in a wet soil or an aquifer. The multi-fluid diffuser 250 receives three fluid streams. In one embodiment, the first stream that is fed to the inlet 252a is a liquid such as water, whereas second and third streams that feed inlets 52b and 52c are hydrogen peroxide and a gas stream of air/ozone.

The multi-fluid diffuser 250 has water in its interior, occasioned by its introduction into the aquifer. The air ozone gas stream enters the multi-fluid diffuser 250 and diffuses through the cylindrical member 256 as trapped microbubbles into the space occupied by the microporous materials where a liquid, e.g., hydrogen peroxide is introduced to coat the microbubbles. The liquid stream through the microporous materials is under a siphon condition occasioned by the introduction of water through the periphery of the multi-fluid diffuser 250. The flow of water in additional to producing a siphoning effect on the liquid introduced through inlet 252b also has a shearing effect to shear bubbles from the microporous sides of the cylindrical member 260, preventing coalescing and bunching of the bubbles around micropores of the cylindrical member 260. The shearing water flow carries the microbubbles away through the well screen disposed at the bottom of the multi-fluid diffuser 250.

Figures 13A, 13B:
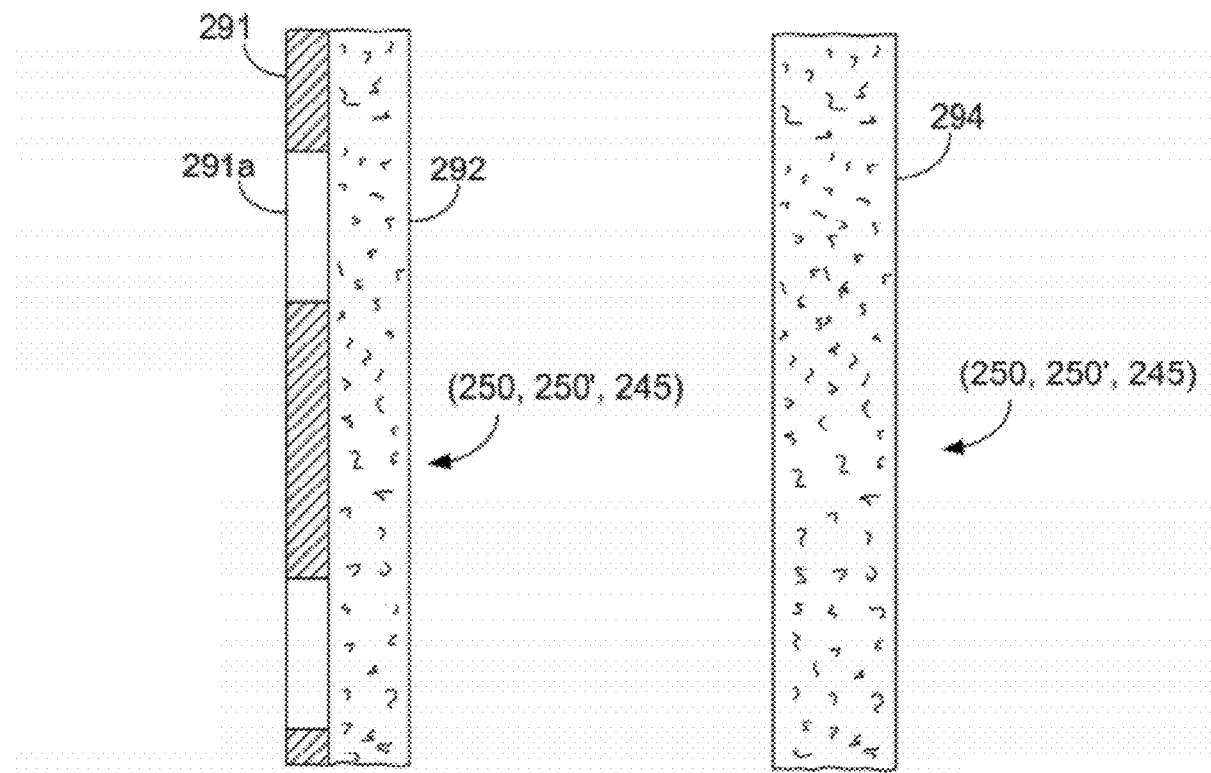
FIGS. 13A and 13B are cross-sectional view of sidewalls of the multi-fluid diffuser of FIG. 3 or 4 showing exemplary construction details.

Referring now to FIGS. 13A, 13B, exemplary construction details for the elongated cylindrical members of the multi-fluid diffusers 250 or 250' and the laminar microporous diffuser 245 are shown. As shown in FIG. 13A, sidewalls of the members can be constructed from a metal or a plastic support layer 291 having large (as shown) or fine perforations 291a over which is disposed a layer of a sintered i.e., heat fused microscopic particles of plastic to provide the micropores. The plastic can be any hydrophobic material such as polyvinylchloride, polypropylene, polyethylene, polytetrafluoroethylene, high-density polyethylene (HDPE) and ABS. The support layer 291 can have fine or coarse openings and can be of other types of materials.

FIG. 13B shows an alternative arrangement 294 in which sidewalls of the members are formed of a sintered i.e., heat fused microscopic particles of plastic to provide the micropores. The plastic can be any hydrophobic material such as polyvinylchloride, polypropylene, polyethylene, polytetrafluoroethylene, high-density polyethylene (HDPE) and alkylbenzylsulfonate (ABS). Flexible materials are desirable if the laminar microporous diffuser 245 is used in an arrangement as in FIG. 10.

The fittings (i.e., the inlets in FIG. 10,) can be threaded and/or are attached to the inlet cap members by epoxy, heat fusion, solvent or welding with heat treatment to remove volatile solvents or other approaches. Standard threading can be used for example NPT (national pipe thread) or box thread e.g., (F480). The fittings thus are securely attached to the multi-fluid diffusers 250 in a manner that insures that the multi-fluid diffuser 250 can handle pressures that are encountered with injecting of the air/ozone.

Figure 14:
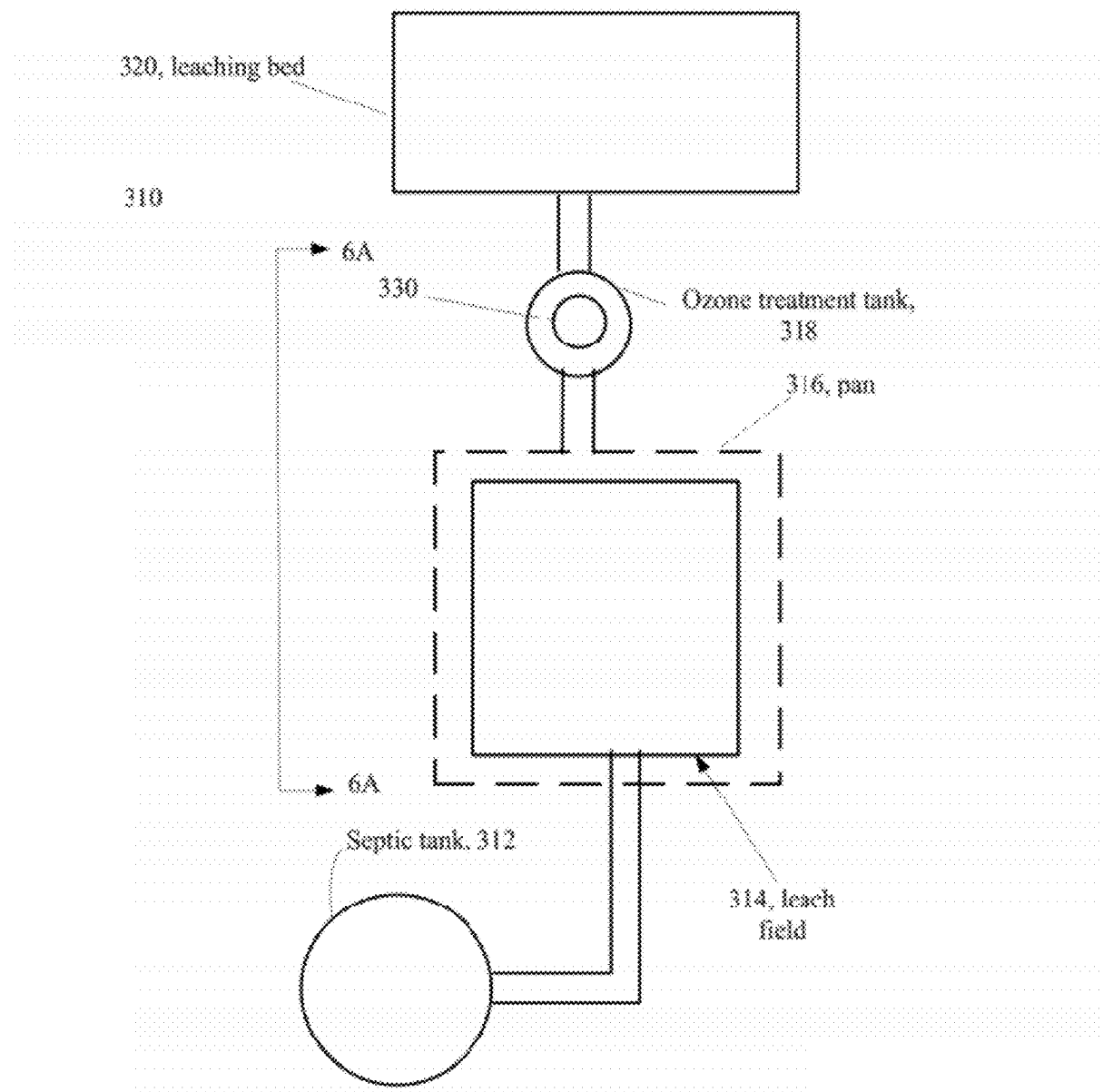
FIG. 14 is a diagrammatical plan view of a septic system.

Referring to FIGS. 14 and 6A, a septic system 310 is shown. The septic system includes a septic tank 312, coupled to a leach field 314 having perforated distribution pipes or chambers (not shown) to distribute effluent from the tank 312 within the leach field. The tank can be coupled to a residential premises or a commercial establishment. In particular, certain types of commercial establishments are of particular interest. These are establishments that produce effluent streams that include high concentration of pharmaceutical compounds, such as pharmaceutical laboratories and production facilities, hospitals and nursing homes.

The leach field 314 is constructed to have an impervious pan, 116 spaced from the distribution pipes by filter media 322 (FIG. 6A). The pan is provided to intercept and collect water from filter media 322 in the leach field after treatment and deliver the water and remaining contaminants via tube 317 to an ozone treatment tank 318. The water may still have high concentrations of nitrogen containing compounds and pharmaceutical compounds. The ozone treatment tank 318 is disposed between the leach field 320 and the final leach field 314. The first phase of treatment may also employ a denitrification system with 1 or 2 leaching fields. The ozone treatment tank 318 temporarily stores the collected water from the pan 316. The ozone treatment tank 318 has an in-situ microporous diffuser, such as those described in FIGS. 11, 12 or receives a solution from a diffuser 330 described in FIG. 15, below, to inject air/ozone in the form of extremely small bubbles, e.g., less than 20 microns and at higher ozone concentrations. In addition, the diffuser (FIG. 15) is configured to supply the air/ozone in stream of water that comes from an external source rather than using the effluent from the leach field 314 to avoid clogging and other problems.

Figure 16:
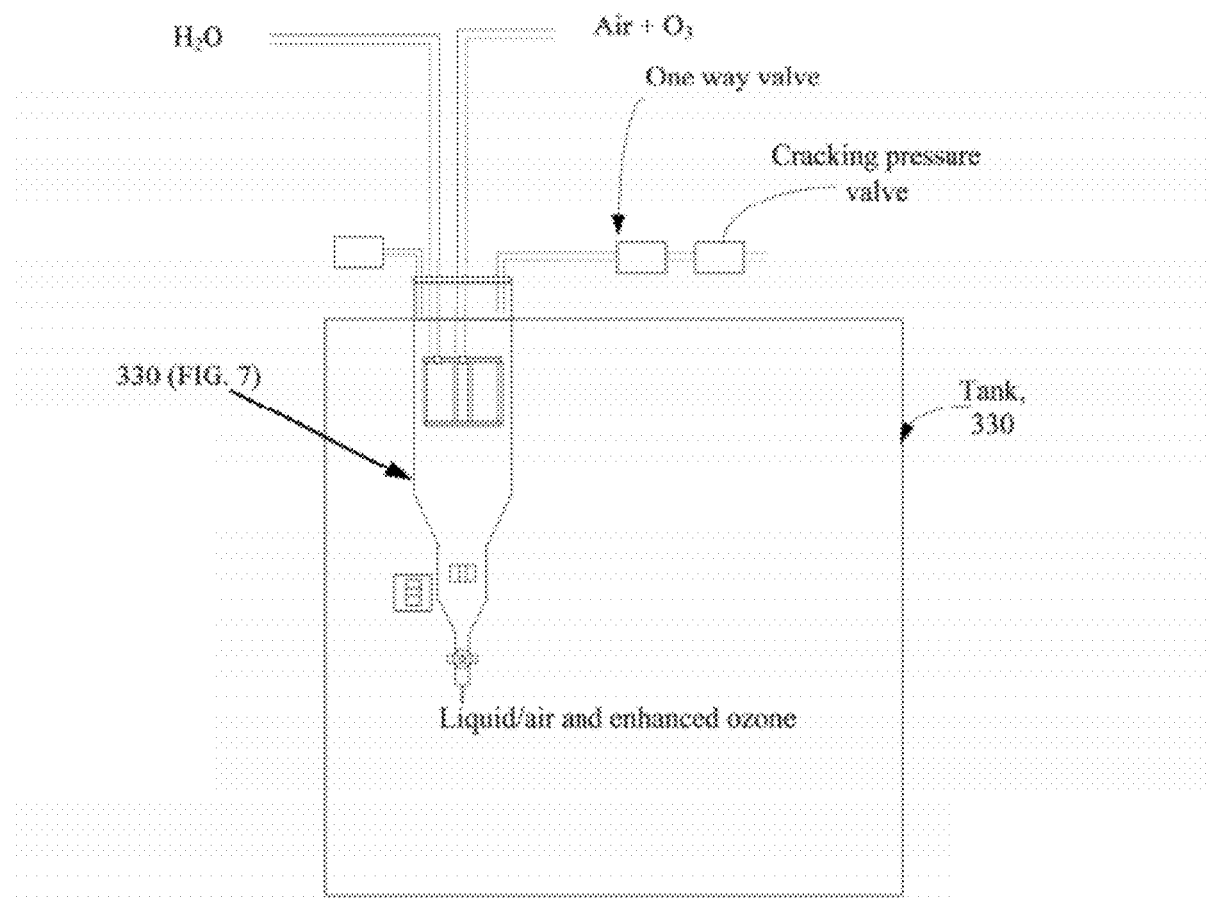
FIG. 16 is a view showing a detail of a ozone treatment chamber and the multi-fluid diffuser of FIG. 15.

In another embodiment (FIG. 6A), the bubble generator system is disposed outside of the tank 318 and has a tube 323 that feeds a porous mixing chamber 325 (static or with a stirrer) at the bottom of the tank 380. Acoustic probes, e.g., 321 can be disposed within the tips of the tubes, as shown in FIG. 14B at the egress of tube 323 and as shown in phantom at the ingress of tube 323, to further agitate and shape the bubbles. Other embodiments as shown in FIG. 16 can have the bubble generator disposed in the tank 318.

Referring now to FIG. 15, a diffuser 330 includes a bubble generator 332 disposed within a container, e.g., a cylinder 334 having impervious sidewalls, e.g. plastics such as PVDF, PVC or stainless steel. In embodiments with magnetic stirrers, the walls of the container, at least those walls adjacent to the magnetic stirrer are of non-magnetic materials.

The bubble generator 332 is comprised of a first elongated member, e.g., cylinder 332a disposed within a second elongated member, e.g., cylinder 332c. The cylinder 332a is spaced from the cylinder 332c by microporous media, e.g., glass beads or sintered glass having particle sized of, e.g., 0.01 microns to 0.1 microns, although others could be used. Fittings 333a and 333b are disposed on a cap 333 to received fluid lines (not numbered). A bottom cap 335 seals end portions of the cylinders 332a and 332b. The cylinders 332a and 332c are comprised of sintered materials having microporosity walls, e.g., average pore sizes of less than one micron or (1 to 0.25 microns). The sintered cylinder 332b or bead material with diameters of 0.2 to 20 microns, with a porosity of 0.4 to 40 microns, receives liquid. Granular materials 349, such as sand, can be included along with a screen 347, as shown to assist with formation of fine bubbles. The screen 347 would need to have openings small enough to keep the sand in the diffuser 350.

Disposed in a lower portion of the cylindrical container 334 is a stirring chamber 340 provided by a region that is coupled to the cylindrical container 334 via a necked-down region 338. This region, for use with a magnetic stirrer, is comprised on non-magnetic materials, other that the stirring paddle. Other arrangements are possible such as mechanical stirrers. The stirring chamber supports a paddle that stirs fluid that exits from the necked down region 338 of cylindrical container 334 and which in operation causes a vortex to form at the bottom of the necked down region 138 and below the generator 332. A magnetic stirrer 344 is disposed adjacent the stirring chamber 340. Alternatively the stirrer can be as shown as the stirrer with electric coil (not numbered).

Figure 15A:
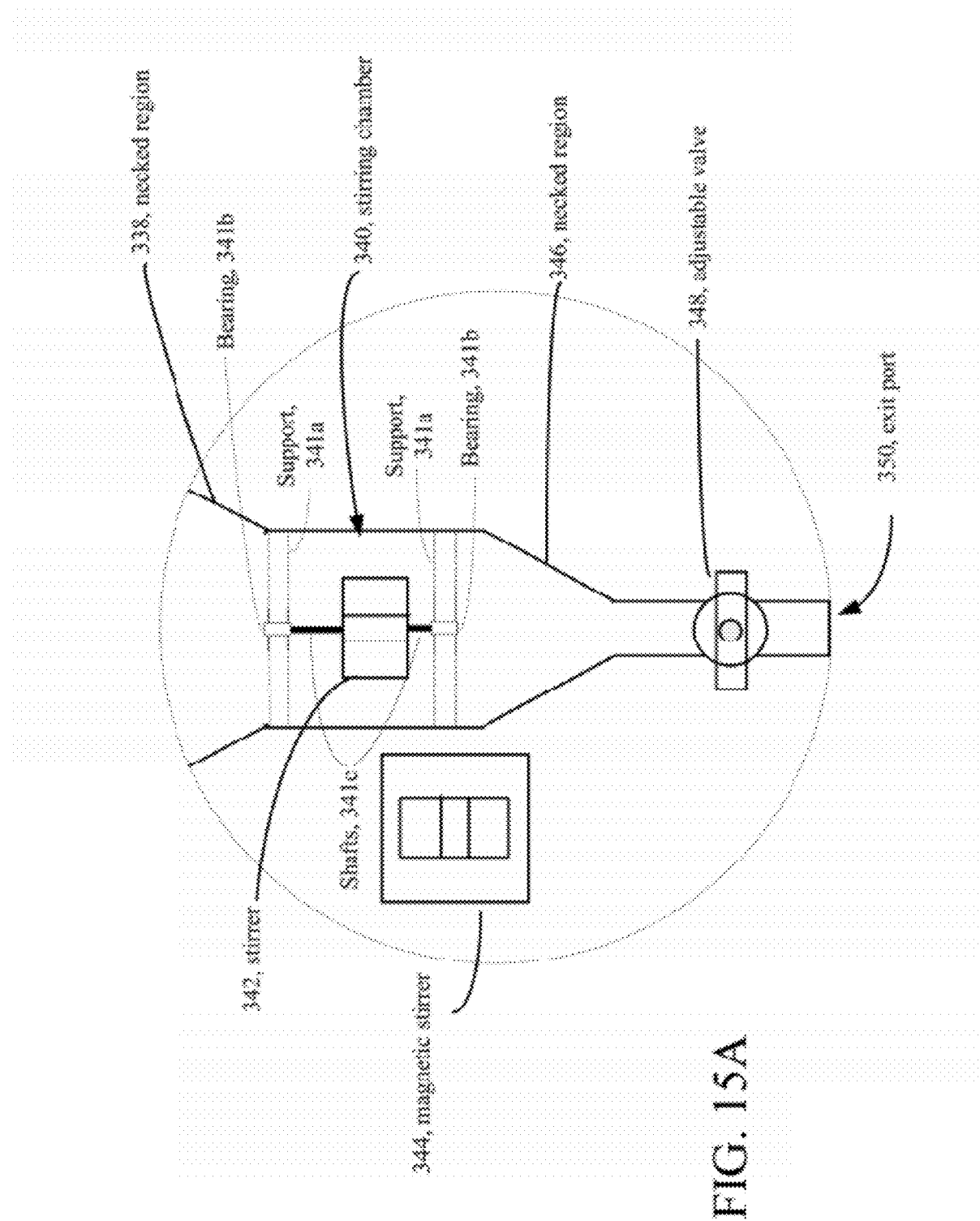
FIG. 15A is a blown up view of a portion of FIG. 15.

A second necked down region 346 couples the stirring chamber 340 to an exit port 349. Disposed in the exit port 349 is an adjustable valve 348. The adjustable valve is used to adjust the fluid flow rate out of the diffuser 330 to allow the egress rate of fluid out of the diffuser 330 to match the ingress rate of fluid into the diffuser 330. As shown in detail in FIG. 15A the stirrer 342 has shafts that are coupled to a pair of supports 141a within the stirring chamber 140, via bearings 342b or the like. Other arrangements are possible. The supports are perforated, meaning that they have sufficient open area so as not to inhibit flow of fluids. The supports can be perforated disks, as shown, or alternatively bars or rods that hold the bearings and thus the shafts for stirrer in place.

Referring now to FIG. 16, the diffuser 330 is disposed in the ozone contact tank 330. In operation, water or another liquid (e.g., Hydrogen Peroxide especially for sparging applications of FIGS. 1 and 2) is delivered to one port 333c of the generator 332 via tubing, not referenced. A dry air+Ozone stream is delivered to the other port 333a of the generator 332. As the air+ozone stream exits from walls of the cylinder 332a the air+ozone is forced out into the microporous media 332b where the air+ozone come in contact with the liquid delivered to port 332c. The liquid meets the air+ozone producing bubbles of air+ozone that are emitted from the bubble generator 332, as part of a bubble cloud of the stream of water.

The stirring action provided by the stirrer 140 produces a vortex above the stirrer 140 with cavitation of the liquid stream, producing nano size bubbles. The ideal liquid velocity is maintained at greater than 500 cc/min across a less than 1 micron porosity surface area of 10 cm$^2$. The stirrer maintains a rotational flow velocity of greater than 500 cm$^3$/min per 8 cm surface area, maintaining a porosity less than 5 microns.

In one arrangement, the sidewalls of the tubes have a porosity of 1 to 0.25 µm (microns), and the interstitial portion that receives liquid and has glass beads of diameter 0.1 mm or less. The sidewalls can be of sintered glass, sintered stainless steel, a ceramic or sintered plastics, such as polyvinyl chloride (PVC), high density polyethylene (HDPE), polyfluorocarbons (PVDF), Teflon.

The diffuser 330 can be continuously fed a water stream, which produces a continuous outflow of submicron size bubbles that can be directed toward a treatment, which is an advantage because the bubble generator 332 inside the diffuser 330 is not exposed to the actual waters being treated and therefore the generator 332 will not foul in the water being treated.

Figure 17:
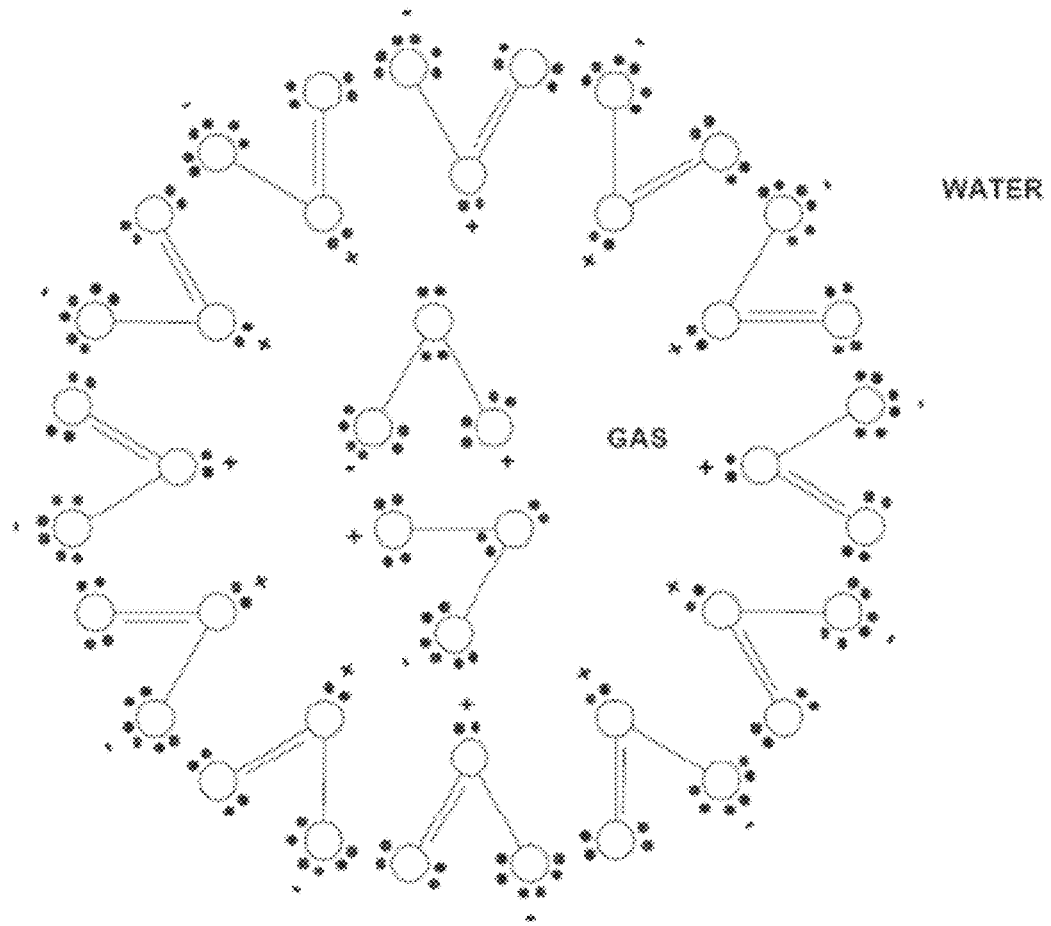
FIGS. 17 and 17A are diagrammatical views representing a structure of ozone.

Referring now to FIG. 17, a depiction of a unique bubble arrangement that occurs under specified conditions with gaseous ozone provided within extremely fine bubbles at relatively high ozone concentrations, e.g., ozone from 5 to 20% concentration with the balance air e.g., oxygen and nitrogen is shown. The arrangement has ozone, which has a polar structure of tri-atomic oxygen (ozone), forming constructs of spherical reactive "balls." As depicted, for a single slice of such a spherical ball, the ozone at the interface boundary of the gas with the water has a surface in which the ozone molecule is aligned and linked. These constructs of ozone allow very small 20 to 20,000 nanometer bubble-like spheres of linked ozone molecules to form in subsurface groundwater, which are not believed possible for simple bubbles of air alone or air with ozone at lower concentrations, due to high surface tension.

The structure shown in FIG. 17 contains gaseous ozone and air on the inside and an ozone membrane arrangement like a micelle on the gas-water interface, as shown.

As bubbles of ozone become smaller and smaller, e.g., from micron to nano size bubbles, the ozone content in the bubbles aligns, meaning that the ozone molecules on the surface of the bubble, i.e., adjacent water, orient such that the predominantly the outer oxygen atoms (negative charge) align outwards, whereas the center oxygen atom (positive or neutral charge) aligns inward.

Figure 17A:
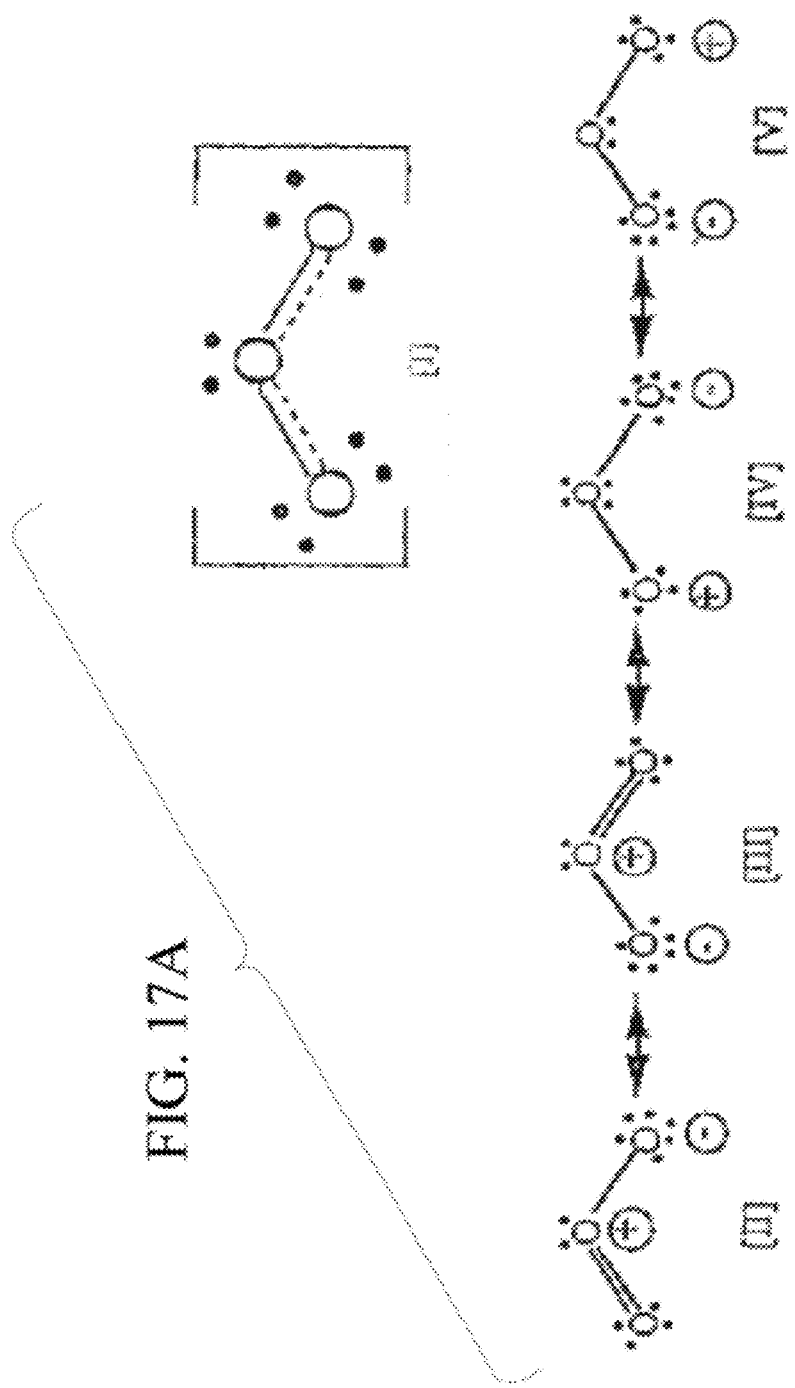

The interface between the aligned ozone molecules and surrounding water provides a reactive skin zone or interface. In this structure it is believed that the ozone "sticks" to the surface film of the water to re-orientate itself. In this orientation the ozone can resonate between two of the four theorized resonance structures of ozone, namely type II and type III (See FIG. 17A), whereas when the ozone comes in contact with a contaminant, it may switch to the more reactive forms types IV and V donating electrons to decompose the contaminate. A terminal oxygen atom thus can become positively charged so as to act as an electrophilic to attack a nucleophilic site of an organic molecule. All of the four resonance structures have a negatively charged terminal oxygen atom causing ozone to act as a nucleophile to attack an electrophilic site on an organic molecule. Ozone acting as a nucleophile can attack electron deficient carbon atoms in aromatic groups. Structures IV and V where ozone acts like a 1, 3 dipole undergoes 1, 3 dipole cycloaddition with unsaturated bonds to result in a classical formation of the Criegee primary ozonide.

The membrane (skin-like) structure of the ozone depicted in FIG. 17 can be a formidable resonance reactor because as volatile organic compounds are pulled into the structure (according to Henry's law) when the compounds come in contact with the skin-like structure electron flow can quickly proceed for substitution reactions. With excess ozone gas in the bubble, replacement of the lost ozone in the skin layer of the bubble is quick.

The resonance hybrid structure of the ozone molecule has an obtuse angle of 116° 45"+35" and an oxygen bond length of 1.27 Å (about 0.13 nm). Trambarolo, et al., (1953) explained that the band length was intermediate between the double bong length in $O_2$ (1.21 Å) and the single bond length in hydrogen peroxide $H_2O_2$ (1.47 Å). The resonance hybrid can be thought of orienting with the negative (–) charge outwards and the positive charge inwards with linkage occurring similar to Kekule' structure of carbon by alternating resonance forms among the aligned bonding electrons. This structure of the ozone changes surface tension with water to produce extremely fine micro to nanobubbles unable to be formed with air (nitrogen/oxygen gas) alone.

The surface properties of the ball structure promote the formation of a reactive surface equivalent to hydroxyl radicals or found with thermal decomposition of ozone in collapsing cavitation bubbles of sonolytic systems. The reactivity with organic contaminants such as alkanes or 1, 4 Dioxane may approach or exceed the reactivity of ozone and peroxide addition, known to produce hydroxyl radicals.

The basis for this discovery includes observed changes in surface tension, allowing smaller and smaller bubbles with increasing ozone concentration. In addition, the equivalent reactivity of the nano-micro bubbles with that of hydroxyl radical formers is greater. For example, the reactivity is unquenched with carbonate addition where hydroxyl radical reactions are quickly quenched. In addition, the ozone has an increased capacity to react with ether-like compounds such as MTBE and 1, 4 Dioxane compared to what would be expected.

For example, Mitani, et al., (2001) determined in a laboratory study that if $O_3$ alone were used to remediate MTBE, then increased residence time, temperature, or $O_3$ concentration was necessary to completely oxidize MTBE to carbon dioxide. Generally, it is assumed that the initial OH. attack on MTBE by H. abstraction occurs at either methoxy group or any of the three methyl groups. The O—H bond energy is higher than that of the C—H bond of an organic compound, resulting in OH. indiscriminately abstracting hydrogen from organic compounds (Mitani, et al., 2001).

The direct bubbling of ozone from the microporous diffuser 250 (FIGS. 11, 12), where a liquid is forced through simultaneously with ozone gas or the diffuser 330 (FIG. 15) produces stable submicron-sized bubbles. The mean size of the bubbles can be checked by measuring the rise time of an aerosol-like cloud of such bubbles in a water column.

The unique spherical formation would explain a certain amount of previously unexplainable unique reactivities (with alkane fractions, for example). The reactivity of the microfine ozone bubbles with linear and branched alkanes would be a possible explanation for such low ratios of molar reactivities.

The size of bubbles would run from twenty nanometers (nm) or smaller up to about 20 microns (20,000 nm) in size. At 20 microns, the ozone concentration would be in a range of about 1% up to a maximum of 20%, whereas at the smaller size bubbles can be less, e.g., from 1% to 20% at the higher end to less than 1% because of higher surface area. Another range would be twenty nanometers (nm) or smaller up to about 1 micron in size with 1 to 10% ozone concentration. Normally, a 20 micron sized porosity microporous diffuser will produce bubbles of about 50 microns in diameter and thus smaller porosity microporous diffusers would be used or the arrangements discussed below to produce the smaller bubbles.

Possibly the entire surface area of the bubbles need not be occupied completely with the ozone molecules in order to start observing this effect. At as little as 10% (85% oxygen, balance nitrogen) of the surface area of the bubbles need be covered by ozone in order for the effect to start occurring.

The oxygen atoms in the ozone molecule have a negative charge which allows the oxygen atoms to break into smaller bubbles in water by changing surface tension. The ozone undergoes a structural change by orienting the negative and positive charges. The ozone structures have resonance structure and the ozone in the form of a gas with water molecules, could preferentially take an orientation that places the polar bonded oxygen atoms towards the water and the central oxygen atoms towards the middle of the bubbles, with the interior of the bubbles filled with ozone and air gases.

Certain advantages may be provided from this type of structure with respect to treating organic contaminants.

Because of the resonant structure of ozone, this structure appears to be inherent more reactivity than is normally associated with dissolved molecular ozone. Conventionally mixing hydrogen peroxide with ozone is thought to produce hydroxyl radicals and a concomitant increase in oxidative potential. When formed in water, however, the reactivity of hydrogen peroxide and ozone with certain materials appears to be far superior to that of normal hydroxyl radical formation. This can be particularly event with ether-like compounds and with simple carbon lineages like the octanes and hexanes.

The level of reactivity cannot be explained simply by increases in the surface to volume ratio that would occur when ozone is placed in smaller and smaller structures. The reactivity that occurs appears to be a heightened reactivity where the ozone itself is competing with ozone plus peroxide mixtures, which are normally thought to create the hydroxyl radical which has usually at least two orders of magnitude faster reactivity than dissolved molecular ozone. It is entirely possible that through the reinforcement of the resonation of the molecules of the oxygen that the way the ozone is arranged the ozone can direct more efficient reaction upon contact than individual tri-molecular ozone. Thus, less moles of ozone are needed to produce a reaction with a particular compound. This form of ozone has a reactive-like surface structure.

As the bubbles get finer and finer it is difficult to measure a consistent rate of rise because they go into motion and are bounced around by the water molecules. Secondarily, individual bubbles will "draft," once one moves vertically, resulting in an accelerated line of bubbles. The nanobubbles show exceptional stability.

Pharmaceutical compounds are a particular good target for this enhanced reactive ozone, because pharmaceutical compounds are difficult compounds to decompose.

Figure 18:
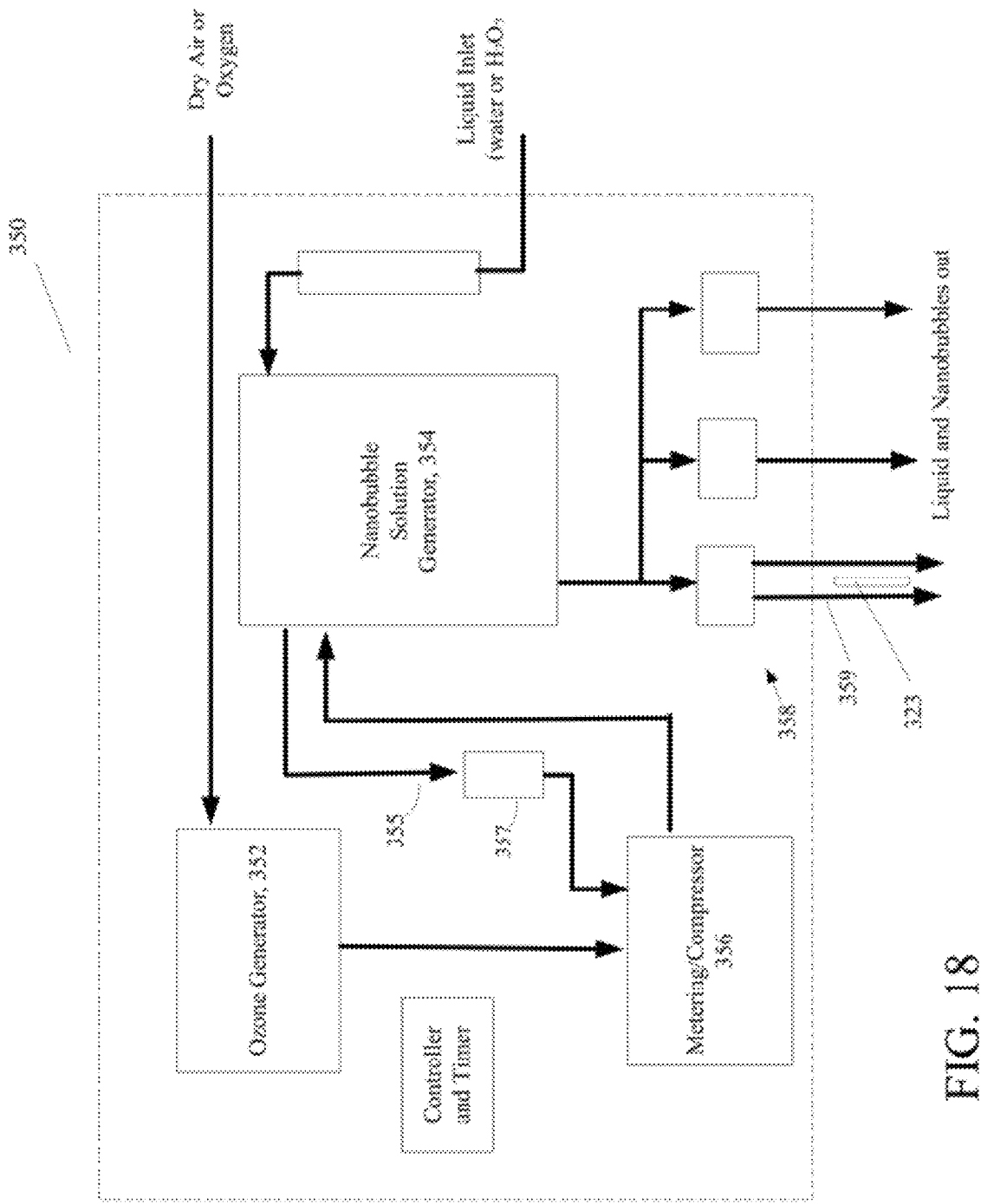
FIG. 18 is a schematic of a nanobubble generator.

Referring to FIG. 18, a nanobubble generator 350 that can be deployed in field operations is shown. The nanobubble generator 350 includes an ozone generator 352 fed via, e.g., dry air or oxygen, a nanobubble solution generator 354 fed liquid, e.g., water or hydrogen peroxide and ozone/air or ozone/oxygen from a compressor 356, Liquid is output from the nanobubble solution generator 354 and includes a cloud of nanobubbles, and is delivered to a bank of solenoid controlled valves 358 to feed tubes 359 that can be disposed in the contact tanks (FIG. 6A. or wells). The feed tubes 359 can have acoustic or sonic probes 123 disposed in the tips, as shown. A controller/timer 153 controls the compressor and solenoid control valves. A excess gas line 355 is connected via a check valve 157 between nanobubble solution generator 354 and the line from the ozone generator to bleed off excess air from the nanobubble solution generator 354.

Figure 8:
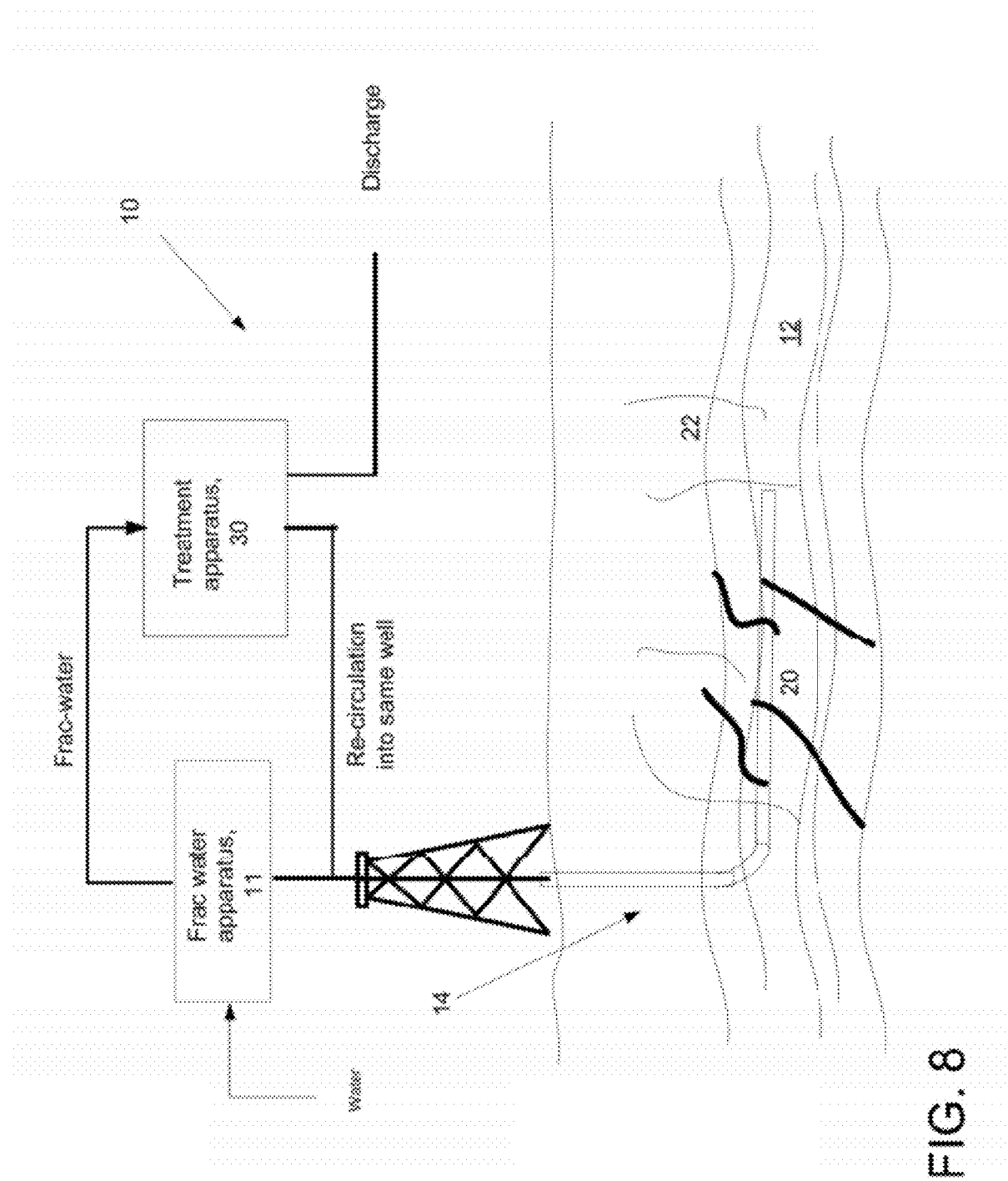
FIG. 8 is a block diagram of an alternative arrangement for horizontal fracturing and/or discharge of treated water.

A number of embodiments of the invention have been described. Treatment parameters given above are exemplary and other parameters may provide suitable results. In addition other techniques may be used to produce the desired size of nanobubbles. In some applications the bubbles need not be nano size but could be micro size bubbles, e.g., generally less that about 500 microns and in particular less than 200 microns, Other examples as shown in FIG. 8 have the treatment apparatus re-injecting water into the same well or for discharge as discussed above. Moreover, other techniques could be used to produce the water with the elevated ORP. For instance, rather than using frac water, water can be treated to provide, e.g., alkanes, and thereafter that water can be treated with ozone or ozone/hydrogen peroxide to provide water with the elevated ORP. Other techniques are possible, such as coating micro to nanobubbles with persulfate, modified Fenton's Reagent, sodium percarbonate, or other surfaces which would enhance formation of hydroxyl radicals. Therefore, it will be understood that various modifications may be made without departing from the spirit and scope of the invention. In addition, other techniques can be used to increase the ORP reactivity of the frac water. Accordingly, other embodiments are within the scope of the following claims.

What is claimed is:

1. An arrangement for hydrocarbon recovery, the arrangement comprising:
   a treatment tank that receives fracture water, recovered in fracture recovery of hydrocarbon product from a formation, and treats the water to provide the water with an oxidation/reduction potential in a range of about 150 mv to 1000 mv, the treatment tank comprising:
   an inlet that receives the recovered fracture water;
   at least one chamber;
   a diffuser disposed in the chamber to introduce gaseous ozone and hydrogen peroxide into the fracture water; and an outlet configured to be coupled to a well that re-introduces the recovered water from the treatment tank into a formation.

2. The arrangement of claim 1 wherein the treatment tank is a baffled treatment tank, comprising a plurality of baffled chambers, with at least some of the chambers having a diffuser disposed therein to deliver ozone and hydrogen peroxide to recovered fracture water in the tank.

3. The arrangement of claim 1 wherein the treatment tank is a baffled treatment tank, comprising a plurality of baffled chambers, with at least some of the chambers having a nanobubble generator disposed in the chamber to deliver nanobubbles of ozone/air coated with hydrogen peroxide.

4. The arrangement of claim 1 further comprising
a storage tank that receives the recovered water from the treatment tank and stores it prior to the recovered water being re-introduced into the formation.

5. The arrangement of claim 1 further comprising
a storage tank coupled to the treatment tank, the storage tank receiving the recovered water extracted from the formation and stores the recovered water prior to the recovered water being introduced into the treatment tank.

6. The arrangement of claim 1 further comprising
a storage tank;
a treatment lagoon fluidly coupled to the storage tank, the treatment lagoon receiving the recovered water from the storage tank to treat the recovered water prior to the recovered water being introduced into the treatment tank.

7. A treatment tank comprising:
a vessel to receive contaminated water and to treat the water, the vessel comprising:
walls to form an enclosure;
an inlet to receive contaminated water;
a plurality of chambers that are partitioned in the vessel by baffle walls that extend between two opposing sides of the vessel with a first group of the baffle walls having a portion that extends above the surface level water and a second group of the baffle walls having bottom portions that are displaced from a bottom surface of the vessel;
diffusers disposed in the chambers to introduce a gas and liquid into the chambers; and
an outlet.

8. The arrangement of claim 7 wherein the diffusers are disposed to deliver ozone and hydrogen peroxide to contaminated water in the vessel.

9. The arrangement of claim 7 wherein at least some of the chambers having a nanobubble generator disposed in the chamber to deliver nanobubbles of ozone/air coated with hydrogen peroxide.

10. The arrangement of claim 7 further comprising
a nanobubble generator disposed as the inlet to the vessel.

11. The arrangement of claim 7 wherein the baffles have a spill-way portion on the top of the baffles that extend above the water line level.

12. The arrangement of claim 7 wherein the baffles have a spill-way portion on the bottom of the baffles that are displaced from the bottom of the vessel.

13. The arrangement of claim 7 where in the diffusers are configured to:
form bubbles having a submicron radius, the bubbles entrapping a high concentration of ozone, with the ozone orienting a net negative charge outwards and a net positive charge inwards.

14. The arrangement of claim 13 wherein the ozone are triatomic structures with oriented negative charge contributed by atoms at the ends of the triatomic structures of the ozone and positive charge contributed by central atoms of the triatomic structure.

15. The arrangement of claim 13 wherein linkage of the ozone occurs between ozone molecules by alternating resonance forms among aligned bonding electrons within the bubbles.

16. The arrangement of claim 13 wherein the bubbles have a diameter of substantially less than 1 micron.

17. The arrangement of claim 13 wherein the bubbles have a diameter of less than 0.1 microns.

18. The arrangement claim 13 wherein the bubbles have a diameter less than 0.01 microns.

19. The arrangement of claim 13 further comprising:
coating the bubbles with a hydrogen peroxide.

* * * * *